United States Patent [19]

Porchia

[11] Patent Number: 4,553,205
[45] Date of Patent: Nov. 12, 1985

[54] FLEXIBLE MACRO EXPANSION PROCESS

[76] Inventor: Salvatore Porchia, 1948 Zollinger Rd., Columbus, Ohio 43212

[21] Appl. No.: 420,730

[22] Filed: Sep. 21, 1982

[51] Int. Cl.⁴ .......................... G06F 9/00; G06F 13/00
[52] U.S. Cl. ..................................... 364/300; 364/200
[58] Field of Search ........................ 364/300, 200, 900

[56] References Cited

U.S. PATENT DOCUMENTS 4,205,371  5/1980  Feather ............................... 364/200
4,374,408  2/1983  Bowles et al. .................. 364/300 X Primary Examiner—Gareth D. Shaw
Assistant Examiner—Daniel K. Dorsey
Attorney, Agent, or Firm—Gipple & Hale

[57] ABSTRACT

A method for conversion of digital computer source code software to operate in a system foreign to that from which the software originated. A library is created in which each entry incorporates the name of a code statement, or macro, which may require conversion and expanded code statements which may be selected to replace the macro. Each expanded code statement may be accompanied by one or more parametric triplets, each of which corresponds to a parameter within the expanded code and expresses a condition under which the expanded code is bypassed depending on the presence or absence of the parameter in any source code statement containing the macro. The source code statements are examined serially and any statement containing no macro entered in the library is passed to an output file, while any macro is replaced by any expanded code from the dictionary for which no bypass condition is satisfied. If it is desired to incorporate macros in expanded code, then the completed output file may replace the source file and the process may be repeated until no further macros are found.

8 Claims, 4 Drawing Figures

FLEXIBLE MACRO EXPANSION PROCESS

BACKGROUND OF THE INVENTION

This invention relates to digital computer programming systems and, more specifically, to a method for conversion of software to operate in a systems environment foreign to that from which it originated.

The rapid growth of the computer hardware industry in the United States has placed on the market a wide variety of programmable digital computers at all price levels. The market for these machines has expanded rapidly because technological advances have caused the price of computing power to fall by a factor of 1,000 within the past decade. Thus, digital computers today are being applied to a far wider variety of tasks than before, including many tasks which, ten years ago, were more economical to perform by hand.

The proliferation of computers has resulted in a shortage of personnel trained to program these systems. This is reflected in the well-known high salaries currently offered to experienced programmers. Moreover, while organizations such as the American National Standards Institute (ANSI) have promoted programming language standards for use on all systems, most manufacturers produce a superset of the applicable ANSI standard language which amounts to a dialect applicable only to systems produced by that manufacturer. As a result, programmers who become familiar with one system and its dialect must spend substantial time learning a second dialect when writing software for a different system.

Also due to differences in dialect, software which has been written and debugged to run on a given machine will seldom, if ever, perform the same functions without error on a different machine. Timing constraints, file conventions, memory allocations and input-output control addresses, as well as other factors, all may be reflected in the text of a given software product. When attempting to modify software to operate on a system other than that from which it originated, failure to properly adjust these factors may cause not only loss of the software itself but also erasure of other files and peripheral storage.

As the shortage of programmers has become more widely recognized, and the libraries of useable software for particular systems have expanded, the need has arisen to convert software from one system to operate on a different system. This would allow programmer efforts to be directed to new developments rather than redevelopment of already-existing software. Generally speaking, however, where conversion has been attempted, it has required the effort of a programmer familiar with both the system from which the software originated and the system to which it is being converted. As noted above, such personnel are difficult to locate and command premium salaries. Therefore, there remains an uneconomical duplication and waste of scarce programming resources to produce software performing identical functions on different systems.

SUMMARY OF THE INVENTION

The present invention provides a process for conversion of software to operate in a system of known dialect characteristics foreign to that from which the software originated. The invention examines the software source code for the presence of one or more statement portions which require change in order to function on the destination system. Such dialect statements are referred to as macros. As the source file is examined, an output file is created to which non-macro statements are transferred without change. Whenever a macro is recognized, the present invention allows it to be passed, deleted or replaced as appropriate to the destination system and dialect.

The present invention provides a flexible macro recognition system which may be easily modified to accommodate the transfer of software between any two systems having known dialect characteristics. Likewise, the disposition of each macro, including the replacement text, if any, is easily altered for the same purposes.

The present invention contemplates that, while many macros may be operative dialect statements which will execute without modification on the system of origin, other statements may be general macros intended to signify a complex operation performed by a series of software statements. It has been determined that the manipulation of data records may be advantageously divided into five basic functional activities, namely merge, update, extract, summarize and sort, all of which may readily be expressed as macros in the environment of a uniform discipline of file definitions and conventions. This permits a programmer to draft idealized or generalized softward using macros initially, followed later by preparation of the specific macro replacement statements necessary for each destination system dialect. Moreover, the statements which replace a macro may themselves advantageously include other macros. Therefore, the present invention contemplates that each completed output file may be treated as an input file and the process repeated, until an input file is found to have no remaining macro present therein.

A library file contains entries, each of which comprises the name of a macro, one or more expansion code statements which may be utilized to replace the macro in an output file, and one or more parametric triplets. Each expansion code statement may contain one or more parameters, with each parametric triplet corresponding to a parameter within the expansion code. The triplet signifies the disposition of the expansion code statement based on the presence or absence of the corresponding parameter in the original source code statement.

It can be readily appreciated that the present invention therefore provides a rapid and efficient method and apparatus for conversion of existing software products from one system to another. The invention may be used repeatly once the dialect characteristics of the system of origin and the system of destination are known and defined. The invention relieves the diversion of scarce and highly-paid programmer personnel from the task to which such personnel are best suited, namely the creation of new and original software products.

Although the invention itself is set forth in the appended claims, these and other objects and advantages of the present invention may be more readily appreciated by reference to the following detailed description thereof when read in conjunction with the accompanying drawings.

DETAILED DESCRIPTION OF THE DRAWINGS

Figure 1:
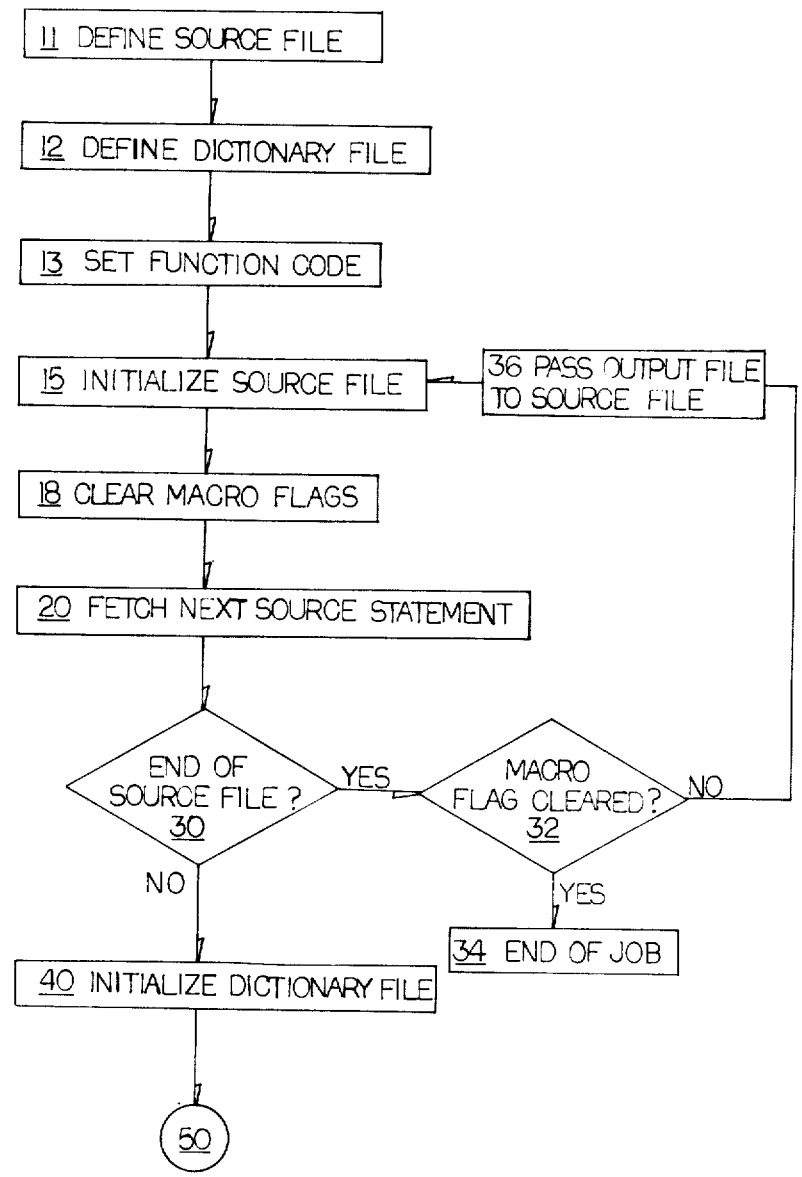
FIG. 1 is a flowchart of a portion of the inventive process.
Figure 2:
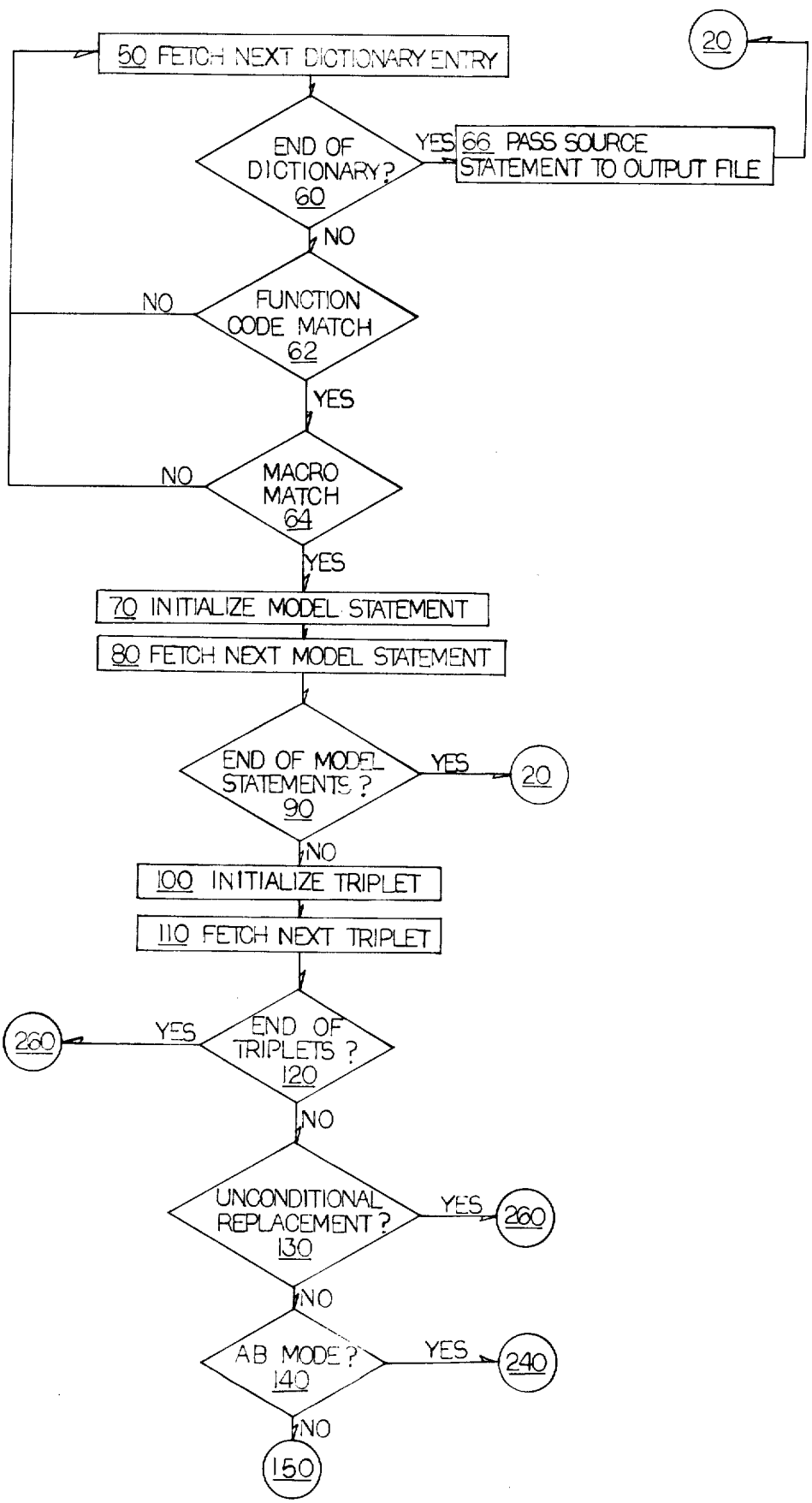
FIG. 2 is a flowchart of a portion of the inventive process which occurs subsequent to that shown in FIG. 1.
Figure 3:
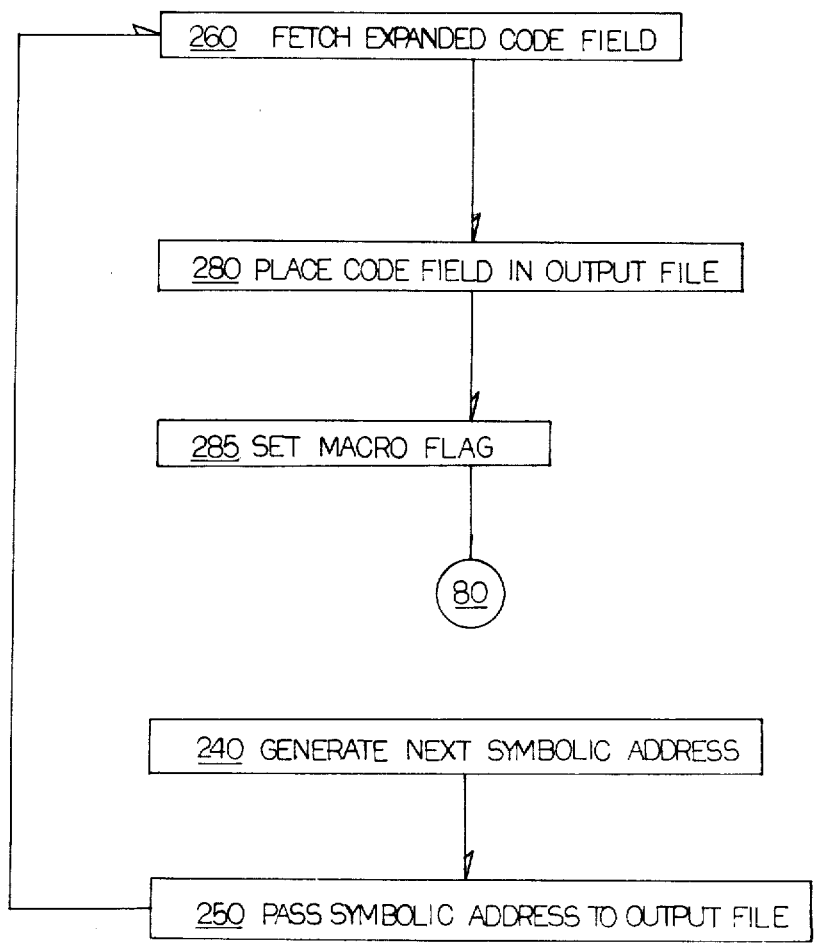
FIG. 3 is a flowchart of a conditional portion of the inventive process, executed with certain conditions arise in the process of FIG. 2.
Figure 4:
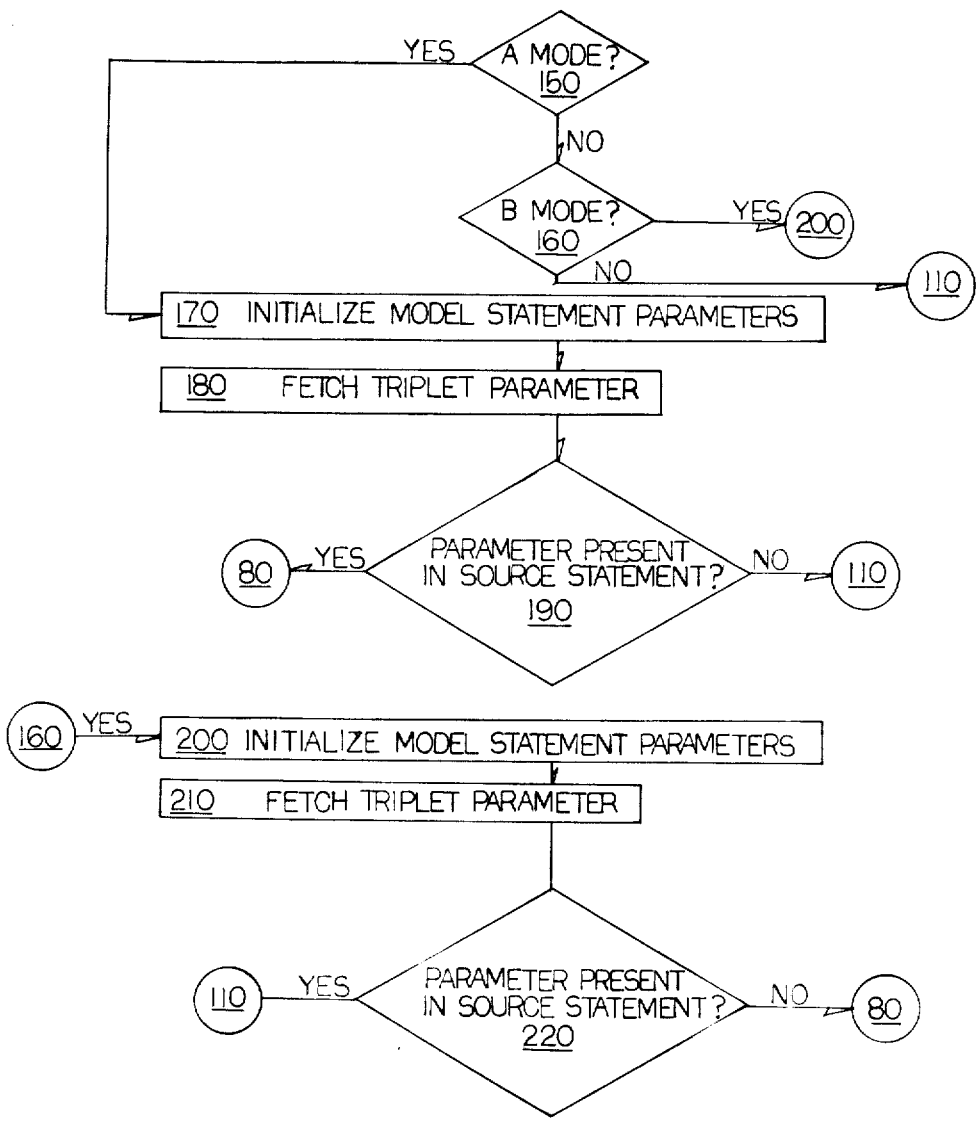
FIG. 4 is a flowchart of another conditional portion of the inventive process which is executed when certain situations arise in the process in FIG. 2.

The best mode and preferred of the present inventive process is illustrated in FIGS. 1 through 4. The inventive process, generally indicated at 10, utilizes logical directives expressed in a library file to transform a source file into an output file. Each of these files may be accessed sequentially, in any manner well known in the art.

The source file comprises a plurality of records, and each record contains one code statement. The file may be bounded by a beginning-of-file marker and an end-of-file marker. Each code statement may be in any recognized language. Among the text of each statement may be located one or more strings of characters comprising a system-dependent code, which will require alteration in order to operate as intended on a system foreign to the system of origin. Such a string of characters is referred to as a macro. Additionally, a macro may require replacement in some instances only on the presence or absence within the same statement of other strings of characters, referred to as parameters. Thus, an individual statement within the source file may contain no macro, or may contain a macro without parameters, or may contain a macro with parameters.

The library file may be subdivided into groups of records, each of which is referred to as an entry. The number of records per entry may be varied. Each entry is bounded by a beginning-of-entry indicator and an end-of-entry indicator. The records within each entry comprise strings of characters including a macro name, a library function indicator, and one or more model statements. Each model statement comprises two fields, one of which comprises an expansion code statement and the other of which may comprise one or more logical expressions here referred to as parametric triplets. The expansion code statement may incorporate one or more parameters, each of which correspond to a parametric triplet. As will be explained in greater detail below, each triplet is a logical expression utilized to determine whether the expansion code statement will be passed to the output file, based on the presence or absence of the corresponding parameter in the original source statement including the macro.

The output file comprises records containing statements transferred sequentially from the source file, intermixed with expansion statements from library entries in replacement of macros and, as required, parameters.

It should be noted that the inventive process and the library file may be expressed as read-only memory (ROM) structures in a general-purpose programmable digital computer.

The inventive progress begins at step 13 with a determination, typically by user input, of the function code to be utilized for library entry selection. As will be seen below, this allows the process to select among different entries, corresponding to different destination systems, for the same macro. Another use is to select entries that expand macros with documentation comments, thus automating the process of creating source file documentation. A further use is to select macros that will specify and define data files and field labels according to a standard structure and discipline to enable the use of file manipulation macros in the source code file. Yet another use is to select macros that will generate initial code for a system of known dialect rather than translate existing code to a destination system.

At step 15, initialization of the source file occurs which, as is well known, may comprise directing a source pointer to indicate the beginning-of-file marker. The pointer typically comprises a numeric value representing the position of the indicated record in main memory or, in a disk operating system environment, on disk. As each record is sequentially fetched, the pointer is incremented by an appropriate value corresponding to the length of each record.

Throughout this specification, each step of the inventive process as illustrated in the figures may be referred to by the numeral which labels the corresponding flow chart subdivision in the figures. The destination of process control transfer is illustrated by an encircled numeral label, which represents a branch to the process step bearing the label.

At step 18, the macro flag pointer is cleared. Following step 18, the next source statement is fetched at step 20, and is examined at step 30 to determine if the end of the source file has been encountered. If so, then the macro flag is examined to determine if it remains cleared. If this condition is also true, then no macros have been located in the source file and the job is at an end 34. If the macro flag has been set, the output file may optionally be passed to the source file at step 36, and step 15 and subsequent steps are conducted again until the source file no longer contains macros.

If the end of the source file is not encountered at step 30, then the library file is initialized at step 40 and the next library entry is fetched at step 50. At step 60, if the end of the library file has been reached, control is transferred to step 66 where the source statement is passed to the output file, and then to step 20. If the end of the library file has not been reached, the library entry fetched in step 50 is examined at step 62 to determine whether the function code designated in step 13 matches the function code of the library entry. If no match is found, control is transferred to step 50. If a match is found, the library entry is again examined at step 54 to determine if the macro name within the entry is found within the source statement fetched at step 20. If no match is found, control is again transferred to step 50.

Upon determination at step 64 that the macro name in the library entry appears in the current source statement, then the first model statement of the dictionary entry is fetched by initialization at step 70 and a fetch at step 80. Each model statement comprises two fields, one of which incorporates expansion code statements which may include one or more parameters, and the second of which may incorporate one or more parametric triplets. Each triplet identifies a corresponding parameter within the expansion code statement field. The triplet field may remain empty.

At step 90, if the end of model statements has been reached, control is transferred to step 20 at which the next source statement is then fetched. If the end of model statements is not reached at step 90, control is transferred to step 100 at which the triplets are initialized, followed by step 110 at which the next triplet is fetched. At step 120, if the triplets in the current model statement have been exhausted, control is transferred to step 260.

The expanded code field is then fetched and, at statement 280, transferred to the output file. At statement 285 the macro flag is then set, thereby indicating that at least one expanded code field has been inserted in the output file. Control is then transferred to step 80.

If the triplets have not been exhausted at statement 120, control is transferred to statement 130.

Each triplet is preferrably a text string comprising indication that the string is a triplet, indication of the parameter corresponding to the triplet and an indication of the replacement mode to be exercised. For instance, in an exemplary model statement, parameters may be stated as text string separated by delimiters, in the expanded code field. The first character of each triplet would indicate the status of the string as a triplet, the second character would specify the sequential position of the corresponding parameter within the code field and the third character would specify the replacement mode to be exercised. However, the present invention contemplates the use of any symbolic expression of these three attributes of a triplet, and is not limited to the use of a discrete character reflecting any one of the attributes.

Following statement 120, the first replacement mode to be tested may be unconditional replacement at step 130. For this mode alone, the triplet may appear without a corresponding parameter in the model statement. If unconditional replacement is indicated by the triplet, control passes to step 260.

If the triplet does not indicate unconditional replacement at step 130, at step 140 the triplet is tested for indication of AB mode. If this mode is indicated, then control passes to step 240 at which an incremental symbolic address is generated. At step 250, this symbolic address is passed to the output file, and control is then passed to step 260. Thus, the expanded code statement in the output file will be labelled with the symbolic address generated at step 240.

If AB mode is not indicated at step 140, control is transferred to step 150 where the triplet is tested for indication of A mode. If this mode is indicated, control is transferred to step 170 where the model statement parameters are initialized, and statement 180 where the parameter corresponding to the triplet is fetched. At step 190, the original source statement is then examined for the presence of the corresponding parameter. If the parameter is found in the original source statement, then control is transferred to step 80 which bypasses transfer of the expansion code from which the parameter was drawn in step 190. If the parameter was not present in the source statement at step 190, then control is transferred to step 110 and the next triplet is fetched for processing.

If the triplet is found not to indicate A mode at step 150, control is transferred to step 160 where the triplet is tested for indication of B mode. If this mode is indicated, control is transferred to step 200 where the expansion code field parameters are initialized, followed by step 210 where the triplet parameter is fetched. At step 220, the original source statement is examined for the presence of the fetched parameter. If the parameter is not present, control is transferred to statement 80. If the parameter is present, then control is transferred to statement 110. Thus, it is clear that the process steps conducted in B mode are substantially the inverse of those conducted in A mode.

If the parametric triplet does not indicate B mode at statement 160, it is an undefined triplet, and control is transferred to statement 110 at which, as noted above, the next triplet in the triplet field is fetched.

The present inventive process has been implemented on a NCR-IMOS computer in the COBOL language. A listing of this implementation follows, in which certain preferred forms are utilized for purposes of illustration only and not by way of limitation of the present invention. The process itself is expressed in COBOL, and the source file and library file are expressed in COBOL as well. Each parametric triplet within a model statement in a library entry is expressed in three consecutive characters. The first character is always the letter "Y", signifying the beginning of the triplet. The second character is numeric, to indicate the relative position of the parameter corresponding to the triplet within the expanded code field of the model statement. The third character of the triplet indicates the mode of the triplet. If the third character is numeric, then the mode is unconditional. If the third character is ASCII value 64 through 73, A mode is indicated. If the third character is ASCII value 74 through 83, then B mode is indicated. If the third character is ASCII value 84 through 93, then AB mode is indicated.

Certain other conventions are also observed in the working implementation. If the triplet field for a model statement is blank, a hyphen (-) placed in the 80th column of the model statement will cause recognition of this condition and placement of the expanded code field for the model statement in the output file. Otherwise, the triplet field is scanned from right to left and triplets are acted on as they are encountered. Each parameter within an expanded code field is delimited by a comma, and a maximum of ten characters are permitted per parameter, with a maximum of fifty parameters per library entry.

Four function codes are observed in the working implementation, all of which appear as a single-character prefix on the macro name in each library entry. The recognized characters are a slash (/), back slash ( ), period (.) and plus (+).

In the working implementation, each library entry includes a macro header record which includes the macro name and function code, the last up-dating date for the entry and comment fields. Following the model statements for the dictionary entry is an end record which consists solely of the word "END" and the macro name.

As noted above, the present inventive process may be advantageously utilized to implement and translate data file manipulation source code in terms of five basic functions: merge, update, extract, summarize and sort. Thus, each macro may be readily recognized in source code as having a specific basic function, and may be readily expressed in differing dialects within library entries. It can therefore be appreciated that the present invention enables a disciplined approach to the creation, documentation, maintenance and translation of data file manipulation source code.

Thus, the present invention provides flexible response to a wide variety of combinations of parameters appearing in an original source statement together with a macro. The decision chain represented by each parametric triplet field permits a precise definition of the conditions under which the associated expansion code field will be passed to the output field.

It should be noted that the steps of the inventive process can be interchangeable without departing from the scope of the invention. Furthermore, these steps can be interchanged and are equivalent. In the foregoing description, the invention has been described with reference to a particular preferred embodiment, although it is to be understood that the specific details shown are merely illustrative and the invention may be carried out in other ways without departing from the true spirit and scope of the following claims.

```
TEXT EDITOR VERSION 04.01.05

LINE      ....+....1....+....2....+....3....+....4....+....5....+....6....+....7....+....8
   1*   000001 IDENTIFICATION DIVISION.                                                    MP3PROG
   2*   000002 PROGRAM-ID.  LOGOS     .                                                    MP3PROG
   3*          AUTHOR.    S. PORCHIA.
   4*   000004 ENVIRONMENT DIVISION.                                                       MP3PROG
   5*   000005 CONFIGURATION SECTION.                                                      MP3PROG
   6*   000006 SOURCE-COMPUTER.   NCR-IMOS.                                                 MP3PROG
   7*   000007 OBJECT-COMPUTER.   NCR-IMOS.                                                 MP3PROG
   8*   000008 INPUT-OUTPUT SECTION.                                                       MP3PROG
   9*   000009 FILE-CONTROL.                                                               MP3PROG
  10*   000010     SELECT SYSLIBL          ASSIGN TO DISC                                   MP3PROG
  11*   000011                             ORGANIZATION IS INDEXED                          MP3PROG
  12*   000012                             ACCESS MODE IS DYNAMIC                           MP3PROG
  13*   000013                             RECORD KEY IS FILE-KEY                           MP3PROG
  14*   000014                             FILE STATUS IS UW-STAT.                          MP3PROG
  15*          SELECT SYSOUTL              ASSIGN TO DISC
  16*                                      ORGANIZATION IS SEQUENTIAL
  17*                                      ACCESS MODE IS SEQUENTIAL.
  18*          SELECT SYSINL               ASSIGN TO DISC
  19*                                      ORGANIZATION IS SEQUENTIAL
  20*                                      ACCESS MODE IS SEQUENTIAL.
  21*          SELECT SYSINPL              ASSIGN TO DISC
  22*                                      ORGANIZATION IS SEQUENTIAL
  23*                                      ACCESS MODE IS SEQUENTIAL.
  24*   *   *******************NOTE************************
  25*   *   THIS PROGRAM IS A DEMONSTRATION OF LOGOS C
  26*   *   COPYRIGHT - 1982 BY THE P & J TRADING CORPORATION
  27*   *   DISTRIBUTION, COPIES AND MODIFICATIONS
  28*   *   WITHOUT WRITTEN PERMISSION BY
  29*   *   THE P & J TRADING CORPORATION
  30*   *   I S    P R O H I B I T E D.
  31*   *   ************************************************
  32*   /
  33*   000015 DATA DIVISION.                                                              MP3PROG
  34*   000016 FILE SECTION.                                                               MP3PROG
  35*   000017 FD  SYSLIBL     BLOCK CONTAINS  006    RECORDS                               MP3PROG
  36*   000018                 RECORD CONTAINS 085    CHARACTERS                            MP3PROG
  37*   000019                 LABEL RECORDS ARE STANDARD.                                  MP3PROG
  38*   000020 01  FREC.                                                                    MP3PROG
  39*   000021     03  FILE-KEY.                                                            MP3PROG
  40*   000022         05  SYSLIB-N   PIC  X(005)           .                               MP3PROG
  41*   000023         05  SYSLIB-Q   PIC  X(006)           .                               MP3PROG
  42*   000024     03  SYSLIB-B       PIC  X(001)           .                               MP3PROG
  43*   000025     03  SYSLIB-T       PIC  X(072)           .                               MP3PROG
  44*   000026     03  SYSLIB-X       PIC  X(001)           .                               MP3PROG
  45*          FD      SYSOUTL        BLOCK CONTAINS 6 RECORDS
  46*                                 RECORD CONTAINS 80 CHARACTERS
  47*                                 LABEL RECORDS ARE STANDARD.
  48*          01      SYSOUREC.
  49*                  03  SYSOURE-1   PIC X(80).
  50*          FD      SYSINL         BLOCK CONTAINS 6 RECORDS
  51*                                 RECORD CONTAINS 80 CHARACTERS
  52*                                 LABEL RECORDS ARE STANDARD.
  53*          01      SYSINREC.
  54*                  03   SYSINRC  PIC X(80).
  55*          FD          SYSINPL    BLOCK CONTAINS 6 RECORDS
  56*                                 RECORD CONTAINS 80 CHARACTERS
  57*                                 LABEL RECORDS ARE STANDARD.
  58*          01          SYSINPREC.
  59*                  03      SYSINPRC  PIC X(80).
  60*   /
  61*   000027 WORKING-STORAGE SECTION.                                                    MP3PROG
  62*   000028*     *** A C C E P T   R O U T I N E   D A T A   A R E A ***                MP3PROG
  63*   000029*          N O N - V O L I T I L E   A R E A S                                MP3PROG
  64*   000030 01  XWA-A0.                                                                  MP3PROG
  65*   000031     03  XWA-STAT           PIC 99.                                           MP3PROG
  66*   000032     03  XWA-DEF            PIC 9.                                            MP3PROG
```

```
67*  000033      03  XWA-HORS                PIC S99 DISPLAY    VALUE 0.    MPBPROG
68*  000034      03  XWA-VRTS                PIC 99 VALUE ZERO.             MPBPROG
69*  000035      03  XWA-HORE                PIC 99.                        MPBPROG
70*  000036      03  XWA-VRTE                PIC 99.                        MPBPROG
71*  000037      03  XWA-NINES               PIC S9(12)V9(6)    COMP-3      MPBPROG
72*  000038                          VALUE  -999999999999.999999.           MPBPROG
73*  000039      03  XWE-ERRFG               PIC 9.                         MPBPROG
74*  000040      03  XWC-DAYE    PIC X(8).                                  MPBPROG
75*  000041      03  XWC-DAY     PIC S9(5)   COMP-3.                        MPBPROG
76*  000042*              V O L I T I L E    A R E A S                      MPBPROG
77*  000043*  THE CONTENTS OF FIELDS IN THE REMAINDER OF THIS ELEMENT       MPBPROG
78*  000044*  IS UNDEFINED UPON EXIT FROM THE VARIOUS TOOLING ROUTINES      MPBPROG
79*  000045*                                                                MPBPROG
80*  000046*           ACCEPT/DISPLAY PACKET DATA                           MPBPROG
81*  000047 01  XWA-PKT.                                                    MPBPROG
82*  000048      03  XWA-SIZ                 PIC 99.                        MPBPROG
83*  000049      03  XWA-HOR                 PIC 99.                        MPBPROG
84*  000050      03  XWA-VRT                 PIC 99.                        MPBPROG
85*  000051      03  XWA-ESIZ                PIC 99.                        MPBPROG
86*  000052      03  XWA-ISIZ                PIC 99.                        MPBPROG
87*  000053      03  XWA-FSIZ                PIC 9.                         MPBPROG
88*  000054*                                                                MPBPROG
89*  000055*           AREA BLANKER                                         MPBPROG
90*  000056 01  XWB-BLNKA          REDEFINES    XWA-PKT.                    MPBPROG
91*  000057      03  XWB-H                   PIC 99.                        MPBPROG
92*  000058      03  XWB-V                   PIC 99.                        MPBPROG
93*  000059      03  XWB-HL                  PIC 99.                        MPBPROG
94*  000060      03  XWB-VL                  PIC 99.                        MPBPROG
95*  000061      03  XWB-VTMP                PIC 999.                       MPBPROG
96*  000062/                                                                MPBPROG
97*  000063*           ACCEPT ALPHA, NUMERIC, BOOLEAN                       MPBPROG
98*  000064 01  XWA-ALPHA.                                                  MPBPROG
99*  000065      03  XWA-ALPHS.                                             MPBPROG
100* 000066          05  XWA-BOOL3.                                         MPBPROG
101* 000067              07  XWA-BOOL2.                                     MPBPROG
102* 000068                  09  XWA-BOOL1   PIC X.                         MPBPROG
103* 000069                  09  FILLER      PIC X.                         MPBPROG
104* 000070              07  FILLER          PIC X.                         MPBPROG
105* 000071          05  XWA-BOOLE  REDEFINES    XWA-BOOL3 PIC ZZ9.         MPBPROG
106* 000072          05  FILLER              PIC X(15).                     MPBPROG
107* 000073      03  XWA-NUMIN       REDEFINES    XWA-ALPHS.                MPBPROG
108* 000074          05  XWA-NUM2            PIC X   OCCURS 18.             MPBPROG
109* 000075      03  XWA-NUM4                PIC 9(12)V9(6).                MPBPROG
110* 000076      03  XWA-NUM3        REDEFINES    XWA-NUM4   PIC X  OCCURS 18. MPBPROG
111* 000077      03  XWA-NUMSN               PIC S9 COMP-3.                 MPBPROG
112* 000078      03  XWA-NUMSC               PIC S99 COMP-3.                MPBPROG
113* 000079      03  XWA-NUMCR               PIC S99 COMP-3.                MPBPROG
114* 000080      03  XWA-NUMCS               PIC S99 COMP-3.                MPBPROG
115* 000081      03  XWA-NUM                 PIC S9(12)V9(6) DISPLAY.       MPBPROG
116* 000082      03  XWA-NSTAT               PIC 9.                         MPBPROG
117* 000083      03  XWA-BOOLN               PIC 999.                       MPBPROG
118* 000084      03  XWA-CSIZ                PIC 99.                        MPBPROG
119* 000085      03  FILLER                  PIC X(12).                     MPBPROG
120* 000086*                                                                MPBPROG
121* 000087*           ERROR MESSAGE                                        MPBPROG
122* 000088 01  XWE             REDEFINES    XWA-ALPHA.                     MPBPROG
123* 000089      03  XWE-ERRSP               PIC X.                         MPBPROG
124* 000090      03  XWE-ERRNO   PIC X(4).                                  MPBPROG
125* 000091      03  XWE-ERRM1.                                             MPBPROG
126* 000092          05  XWE-E-M1    PIC X       OCCURS 11.                 MPBPROG
127* 000093      03  XWE-ERRM2.                                             MPBPROG
128* 000094          05  XWE-E-M2    PIC X       OCCURS 11.                 MPBPROG
129* 000095      03  XWE-ERRX1   PIC 99.                                    MPBPROG
130* 000096      03  XWE-ERRX2   PIC 99.                                    MPBPROG
131* 000097      03  XWE-ERRX3   PIC 99.                                    MPBPROG
132* 000098      03  XWE-ERRX4   PIC 99.                                    MPBPROG
133* 000099      03  FILLER                  PIC X(45).                     MPBPROG
134* 000100/                                                                MPBPROG
135* 000101*           *** D E F A U L T    A R E A S   A N D   M I S C *** MPBPROG
136* 000102*           ALPHA DEFAULT, AREA BLANKER, SPECIALS                MPBPROG
137* 000103 01  XWA-A1.                                                     MPBPROG
138* 000104      03  XWB-BLNKS.                                             MPBPROG
139* 000105          05  XWA-ADEF            PIC X(80).                     MPBPROG
140* 000106      03  XWA-SPECL.                                             MPBPROG
141* 000107          05  XWA-SPECI           PIC X(12).                     MPBPROG
142* 000108          05  XWA-SPECS           PIC X(24).                     MPBPROG
143* 000109      03  XWA-SPCLS   REDEFINES    XWA-SPECL.                    MPBPROG
144* 000110          05  XWA-SPEC            PIC X(6)   OCCURS 6.           MPBPROG
145* 000111*           BOOLEAN DEFAULT                                      MPBPROG
```

```
146*  000112 01  XWA-B1              REDEFINES   XWA-A1.                      MP3PROG
147*  000113     03  XWA-BDEF                    PIC XXX.                     MP3PROG
148*  000114     03  XWA-BOOL.                                                MP3PROG
149*  000115         05  XWA-BOOLI           PIC XXX      OCCURS 26.          MP3PROG
150*  000116     03  FILLER                  PIC X(35).                       MP3PROG
151*  000117*            NUMERIC DEFAULT AND WORK SPACE                       MP3PROG
152*  000118 01  XWA-N1              REDEFINES   XWA-A1.                      MP3PROG
153*  000119     03  XWA-NDEFE               PIC X(18).                       MP3PROG
154*  000120     03  XWA-NDEF                PIC S9(12)V9(6) DISPLAY.         MP3PROG
155*  000121     03  XWA-NINE                PIC S9(12)V9(6) DISPLAY.         MP3PROG
156*  000122     03  XWA-NINER      REDEFINES    XWA-NINE.                    MP3PROG
157*  000123         05  XWA-ININE           PIC X(12).                       MP3PROG
158*  000124         05  XWA-FNINE           PIC X(6).                        MP3PROG
159*  000125*        05  FILLER              PIC X.                           MP3PROG
160*  000126     03  XWA-ENINE               PIC X(18).                       MP3PROG
161*  000127     03  FILLER                  PIC X(42).                       MP3PROG
162*  000128*            *** E R R O R   M E S S A G E   A R E A ***          MP3PROG
163*  000129 01  XWE-ERR.                                                     MP3PROG
164*  000130     03  XWE-ERR-T               PIC X    OCCURS 40.              MP3PROG
165*  000131***                                                               MP3PROG
166*  000132*** DECLARATIVE SECTION - ERROR MESSAGE AREA ***                  MP3PROG
167*  000133***                                                               MP3PROG
168*  000134 01  UW-DECMSG           REDEFINES   XWE-ERR.                     MP3PROG
169*  000135     03  UW-DTXT1                PIC X(11).                       MP3PROG
170*  000136     03  UW-DECS                 PIC XXX.                         MP3PROG
171*  000137     03  UW-DTXT2                PIC XXX.                         MP3PROG
172*  000138     03  UW-DECF                 PIC X(10).                       MP3PROG
173*  000139     03  UW-DTXT3.                                                MP3PROG
174*  000140         05  FILLER              PIC X(11).                       MP3PROG
175*  000141         05  UW-DACP             PIC XX.                          MP3PROG
176*  000142***                                                               MP3PROG
177*  000143*** ACCEPT AREA                                                   MP3PROG
178*  000144***                                                               MP3PROG
179*  000145 01  UW-ACPT                     PIC X    VALUE SPACE.            MP3PROG
180*  000146***                                                               MP3PROG
181*  000147*** DECLARATIVE FILE STATUS.                                      MP3PROG
182*  000148***                                                               MP3PROG
183*  000149 01  UW-STAT                     PIC XX.                          MP3PROG
184*  000150*                                                                 MP3PROG
185*  000151 01  XWA-DEC-CT              PIC 99.                              MP3PROG
186*  000152/                                                                 MP3PROG
187*  000153 01  EDIT1    PIC Z9/99/99.
188*  000154 01  EDIT2    PIC Z9(9).
189*  000155 01  EDIT3    PIC 9(5).
190*  000156 01  EDIT4    PIC 9(4).
191*  000157 01  EDIT5    PIC 99.
192*  000158 01  EDIT6    PIC ZZZ9.99.
193*  000159 01  EDIT7    PIC ZZZ9.9999.
194*  000160 01  EDIT8    PIC ZZ9.9.
195*  000161 01  EDIT9    PIC Z9.99.
196*  000162 01  EDIT10   PIC ZZZ,ZZZ.99.
197*  000163 01  EDIT11   PIC Z,ZZ9.99.
198*  000164 01  EDIT12   PIC ZZZ9.999.
199*  000165 01  EDIT13   PIC ZZ.
200*  000166 01  EDIT14   PIC 999B999B9999.
201*  000167 01  EDIT15   PIC ZZZZ.
202*  000168 01  EDIT16   PIC XXXBXXXX.
203*  000169 01  EDIT17   PIC ZZZZ.
204*  000170 01  EDIT18   PIC ZZZ.
205*  000171 01  EDIT19   PIC ZZZZZ.
206*  000172 01  EDIT20   PIC ZZZZZZ.
207*  000173 01  EDIT21   PIC 9.
208*  000174 01  EDIT22   PIC -----.99.
209*  000175 01  CORRECT-FLAG PIC 9 VALUE 0.
210*  000176 01  EDIT23   PIC 999.
211*  000177 01  EDIT24   PIC 999999.
212*  000178 01  EDIT25   PIC 9999999.
213*  000179 01  EDIT26   PIC 99999999.
214*  000180 01  FCTFLG   PIC 9.                                              MP3PROG
215*  000181 01  FUNCTION PIC XXX VALUE SPACES.                               MP3PROG
216*  000182 01  FCT      PIC 9.                                              MP3PROG
217*  000183 01  SVFCT    PIC 9.                                              MP3PROG
218*  000184 01  RESPONSE PIC XXX.                                            MP3PROG
219*         /
220*         01      RESPONSE2 PIC X.
221*         01          PROC-TYPE-X PIC X.
222*         01          SYSIN-SW PIC X.
223*         01      INRECA-1 PIC X(80) VALUE SPACES.
224*         01      INRECA REDEFINES INRECA-1.
```

```
225*              02  INRECA-I PIC X OCCURS 80 TIMES INDEXED BY INSPECT-CO.
226*         01      OUTRECB  PIC X(80) VALUE SPACES.
227*         01      OURECT REDEFINES OUTRECB.
228*              02  OUTREC-I PIC X OCCURS 80 TIMES INDEXED BY OUTREC-CO.
229*         01      TABLE-A  PIC XXXXXXXXXX VALUE IS "*ABCDEF3HI*".
230*         01      TABLE-B  PIC XXXXXXXXXX VALUE IS "JKLMNOPQRS*".
231*         01      TABLE-AB PIC XXXXXXXXXX VALUE IS "TUVWXYZ(/)*".
232*         01      TABLE-NO PIC XXXXXXXXXX VALUE IS "1234567890*".
233*         01      TABLE-SPECIAL PIC XXXXXXXX.
234*         01      PAR-COU PIC 9999 VALUE ZEROS.
235*         01      LINE-COU PIC 99 VALUE ZEROS.
236*         01      PARM-TABLE.
237*              02  PARM-CARD PIC X(10) OCCURS 50 TIMES INDEXED BY PARM-CO.
238*         01      WREC.
239*              02  WREC-0 PIC X(5).
240*              02  WREC-1.
241*                  03  WREC-1-1   PIC X(6).
242*                  03  WREC-1-2.
243*                  05  WREC-1-2-1 PIC X.
244*                  05  WREC-1-2-2 PIC X(73).
245*         01      PARM-IN-TAB PIC X(10).
246*         01      PARM-IN-TAB-W.
247*              02  PARM-IN-TAB-I PIC X OCCURS 10 TIMES INDEXED BY OUTPARM.
248*         01      BLANK80 PIC X(80) VALUE SPACES.
249*         01      BLANK10 PIC X(10) VALUE SPACES.
250*         01      BLANK1  PIC X(3) VALUE SPACES.
251*         01      SYSLIB-NT PIC X(5).
252*         01      PROCESS-1 PIC X.
253*         01      MEDIA-1   PIC X.
254*         01      END-OF-INPUT PIC X.
255*         01      INPUT-SCR-IN PIC X.
256*         01      FETCH PIC 99.
257*         01      FETCH-0 REDEFINES FETCH.
258*              02  FETCH-1 PIC 9.
259*              02  FETCH-2 PIC 9.
260*         01      EXPANSION PIC X.
261*         01      SPECIAL   PIC X.
262*         01      CONTINUE-1 PIC X.
263*         01      INSPECTOR PIC X.
264*         01      INSPECTOR2 PIC X.
265*         01      LINE-POS-WK.
266*              02  LINE-POS-W-1 PIC XX.
267*              02  LINE-POS-W-2 PIC XX.
268*              02  LINE-POS-W-3 PIC XX.
269*         01      END-PARM-CK PIC X.
270*         01      INSPECT-COU PIC 9999.
271*         01      PROC-TYPE PIC X VALUE SPACES.
272*         01      BLAN-TRIP PIC 9999.
273*         01      FETCH-CO  PIC 99.
274*         01      COUNT-OUT PIC 9999.
275*         01      OUTPARM-COU PIC 9999.
276*         01      OUTREC-COU  PIC 9999.
277*         01      RECOR-COU  PIC 9999.
278*         01      INSPECT-TAL PIC 9999.
279*         01      DIS-COU-ER PIC 9999.
280*         01      OUTPARM-W-CO PIC 9999.
281*         01      DIS-I-O    PIC X.
282*         01      MACRO-INPUT-SW PIC X.
283*         01      SYSLIB-Q-W-I  PIC 9(6).
284*         01      SYSLIBM-SAVE  PIC 9999.
285*         01      OUTPARM-T PIC X.
286*         01      SYSIND-SW   PIC X.
287*         01      Y-SW PIC X.
288*         01      SYSIN-W.
289*              03  SYSINW-Q  PIC X(6).
290*              03  SYSINW-B  PIC X.
291*              03  SYSINW-T .
292*                  05  SYSINW-NT PIC X(5).
293*                  05  SYSINW-TT PIC X(67).
294*              03  SYSINW-X  PIC X.
295*         01      MACLIB-N PIC X(5).
296*         01      PASS-WORD-1 PIC X(6).
297*         01      PASS-WORD-VAL PIC X(6) VALUE IS "PAOLA ".
298* 000185/                                                                MP3PROG
299* 000186 PROCEDURE DIVISION.                                             MP3PROG
300* 000187 DECLARATIVES.                                                   MP3PROG
301* 000188 FL SECTION.                                                     MP3PROG
302* 000189     USE AFTER ERROR PROCEDURE ON SYSLIBL    .                   MP3PROG
303* 000190 F-ER.                                                           MP3PROG
```

```
304*    000191          MOVE  "SYSLIBL  " TO UW-DECF.                                  MPBPROG
305*    000192          PERFORM UPD-CHECK.                                             MPBPROG
306*    000193**                                                                       MPBPROG
307*    000194**    DECLARATIVES - GENERAL ROUTINE                                     MPBPROG
308*    000195**    IF STATUS CODE = 99 THIS ROUTINE RETURNS TO CALLER                 MPBPROG
309*    000196**                                                                       MPBPROG
310*    000197          GO TO UPD-EXIT.                                                MPBPROG
311*    000198 UPD-CHECK.                                                              MPBPROG
312*    000199          IF UW-STAT = "OF"                                              MPBPROG
313*    000200              MOVE "LIO STATUS" TO UW-OTXT1                              MPBPROG
314*    000201              MOVE "ON" TO UW-OTXT2                                      MPBPROG
315*    000202              MOVE UW-STAT TO UW-OECS                                    MPBPROG
316*    000203              PERFORM UPD-DI-AC                                          MPBPROG
317*    000204              MOVE "00" TO UW-STAT.                                      MPBPROG
318*    000205          IF UW-STAT GREATER 23                                          MPBPROG
319*    000206              MOVE "LIO STATUS" TO UW-OTXT1                              MPBPROG
320*    000207              MOVE "ON" TO UW-OTXT2                                      MPBPROG
321*    000208              MOVE UW-STAT TO UW-OECS                                    MPBPROG
322*    000209              PERFORM UPD-DI-AC.                                         MPBPROG
323*    000210 UPD-DI-AC.                                                              MPBPROG
324*    000211          IF UW-STAT = "99"                                              MPBPROG
325*    000212              MOVE "BUSY-HIT NL" TO UW-OTXT3                             MPBPROG
326*    000213          ELSE                                                           MPBPROG
327*    000214              IF UW-STAT = "OF"                                          MPBPROG
328*    000215                  MOVE "AT CAPACITY" TO UW-OTXT3                         MPBPROG
329*    000216                  DISPLAY "CONSULT YOUR DOCUMENTATION"                   MPBPROG
330*    000217                     LINE 24, POSITION 42                                MPBPROG
331*    000218              ELSE                                                       MPBPROG
332*    000219                  MOVE "HIT NL" TO UW-OTXT3                              MPBPROG
333*    000220                  DISPLAY "CONSULT YOUR DOCUMENTATION"                   MPBPROG
334*    000221                     LINE 24 POSITION 42                                 MPBPROG
335*    000222              DISPLAY UW-OECMSG LINE 24, POSITION 1                      MPBPROG
336*    000223              ACCEPT UW-OECMSG LINE 24, POSITION 39                      MPBPROG
337*    000224              STOP RUN.                                                  MPBPROG
338*    000225          DISPLAY UW-OECMSG LINE 24.                                     MPBPROG
339*    000226          ACCEPT UW-OACP LINE 24 POSITION 39.                            MPBPROG
340*    000227          IF UW-STAT NOT = "99"                                          MPBPROG
341*    000228          IF UW-STAT NOT = "OF"                                          MPBPROG
342*    000229              GO TO UPD-DI-AC.                                           MPBPROG
343*    000230 UPD-EXIT.                                                               MPBPROG
344*    000231 END DECLARATIVES.                                                       MPBPROG
345*    000232/                                                                        MPBPROG
346*    000233 MAIN-RT SECTION 1.                                                      MPBPROG
347*    000234 INIT-RT.                                                                MPBPROG
348*                    MOVE "N" TO SYSIND-SW.
349*                    MOVE "N" TO SYSIN-SW.
350*                    MOVE "N" TO PROC-TYPE-X.
351*                    MOVE "N" TO INPUT-SCR-IN.
352*                    MOVE "Y" TO DIS-I-O.
353*    000236          GO TO SCRN-DIS-O.                                              MPBPRO
354*    000237*              *** A C C E P T   A L P H A N U M E R I C ***             MPBPROG
355*    000238 XPA-ACPTA.                                                              MPBPROG
356*    000239          PERFORM XPA-ACPT1 THRU XPA-ACPT9.                               MPBPROG
357*    000240 XPA-ACPT1.                                                              MPBPROG
358*    000241          MOVE 0 TO XWA-STAT.                                            MPBPROG
359*    000242          MOVE ":  +" TO XWA-SPECI.                                      MPBPROG
360*    000243          ADD XWA-HOR XWA-HORS GIVING XWA-HORE.                          MPBPROG
361*    000244          ADD XWA-VRT XWA-VRTS GIVING XWA-VRTE.                          MPBPROG
362*    000245 XPA-ACPTO.                                                              MPBPROG
363*    000246          MOVE XWA-SIZ TO XWA-ESIZ.                                      MPBPROG
364*    000247          IF XWA-DEF = 2 MOVE XWA-ADEF TO XWA-ALPHA                      MPBPROG
365*    000248              PERFORM XPA-SPCHK                                          MPBPROG
366*    000249              GO TO XPA-ACPT4.                                           MPBPROG
367*    000250 XPA-ACPT2.                                                              MPBPROG
368*    000251          IF XWA-DEF = 0 ACCEPT XWA-ALPHA, LINE XWA-VRTE, POSITION       MPBPROG
369*    000252                         XWA-HORE, SIZE XWA-SIZ, PROMPT                  MPBPROG
370*    000253          ELSE           DISPLAY XWA-ADEF, LINE XWA-VRTE, POSITION       MPBPROG
371*    000254                         XWA-HORE, SIZE XWA-ESIZ                         MPBPROG
372*    000255                         ACCEPT XWA-ALPHA, LINE XWA-VRTE, POSITION       MPBPROG
373*    000256                         XWA-HORE, SIZE XWA-SIZ.                         MPBPROG
374*    000257 XPA-SPCHK.                                                              MPBPROG
375*    000258          IF XWA-STAT > 5    MOVE 0 TO XWA-STAT                          MPBPROG
376*    000259          ELSE                                                           MPBPROG
377*    000260              ADD 1 TO XWA-STAT                                          MPBPROG
378*    000261              IF XWA-ALPHA NOT = XWA-SPEC (XWA-STAT)  GO TO XPA-SPCHK.   MPBPROG
379*    000262          IF XWA-ALPHA = SPACES   MOVE 0 TO XWA-STAT.                    MPBPROG
380*    000263 XPA-ACPT3.                                                              MPBPROG
381*    000264          IF XWA-STAT > 0 GO TO XPA-ACPT4.                               MPBPROG
382*    000265          IF XWA-DEF = 1  IF XWA-ALPHA = " "  MOVE XWA-ADEF TO XWA-ALPHA MPBPROG
```

```
383*  000266                                      PERFORM XPA-SPCHK.           MP3PROG
384*  000267        IF XWA-ALPHA = "\" MOVE SPACES TO XWA-ALPHA.                MP3PROG
385*  000268 XPA-ACPT4.                                                         MP3PROG
386*  000269        IF XWA-STAT > 0 IF XWA-STAT < 3                             MP3PROG
387*  000270             MOVE XWA-ADEF TO XWA-ALPHA                             MP3PROG
388*  000271             GO TO XPA-ACPT9.                                       MP3PROG
389*  000272        DISPLAY XWA-ALPHA LINE XWA-VRTE POSITION XWA-HORE            MP3PROG
390*  000273                       SIZE XWA-SIZ.                                MP3PROG
391*  000274 XPA-ACPT9.                                                         MP3PROG
392*  000275        MOVE SPACES TO XWA-A1.                                      MP3PROG
393*  000276        IF XWA-DEF < 2 PERFORM XPE-ERRCL.                           MP3PROG
394*  000277        MOVE 0 TO XWA-HORS XWA-VRTS.                                MP3PROG
395*  000278/                                                                   MP3PROG
396*  000368*                                                                   MP3PROG
397*  000369*         *** B L A N K   A R E A ***                               MP3PROG
398*  000370*                                                                   MP3PROG
399*  000371 XPB-BLNKA. MOVE SPACES TO XWB-BLNKS MOVE XWB-V TO XWB-VTMP         MP3PROG
400*  000372       PERFORM XPB-BLNKV XWB-VL TIMES.                              MP3PROG
401*  000373 XPB-BLNKV. DISPLAY XWB-BLNKS LINE XWB-VTMP POSITION XWB-H SIZE     MP3PROG
402*  000374       XWB-HL ADD 1 TO XWB-VTMP.                                    MP3PROG
403*  000375*             *** ERROR MESSAGE DISPLAY ***                         MP3PROG
404*  000376 XPE-ERR. DISPLAY XWE-ERR LINE 24 MOVE 1 TO XWE-ERRFG.              MP3PROG
405*  000377*                                                                   MP3PROG
406*  000378*             *** ERROR MESSAGE RESPONSE REQUIRED ***               MP3PROG
407*  000379 XPE-ERRSP. PERFORM XPE-ERR ACCEPT XWE-ERRSP LINE 24 POSITION 40    MP3PROG
408*  000380       PROMPT.                                                      MP3PROG
409*  000381*                                                                   MP3PROG
410*  000382*             *** ERROR MESSAGE CLEAR ***                           MP3PROG
411*  000383 XPE-ERRCL. IF XWE-ERRFG = 1 MOVE SPACES TO XWE-ERR DISPLAY         MP3PROG
412*  000384       XWE-ERR LINE 24 MOVE 0 TO XWE-ERRFG.                         MP3PROG
413*          /
414*           SCRN-DIS-0.
415*                DISPLAY "L O G O S  C" LINE 1 POSITION 25, ERASE.
416*                DISPLAY "COPYRIGHT 1982" LINE 2 POSITION 1.
417*                DISPLAY "BY THE P & J TRAD. CORP." LINE 3 POSITION 1.
418*                DISPLAY "ALL RIGHTS RESERVED" LINE 4 POSITION 1.
419*                DISPLAY " PASSWORD" LINE 10 POSITION 1.
420*                ACCEPT PASS-WORD-1 LINE 10 POSITION 10 PROMPT ECHO.
421*                IF PASS-WORD-1 = PASS-WORD-VAL GO TO SCRN-DIS.
422*                GO TO EOJ.
423*  000385/                                                                   MP3PROG
424*  000386 SCRN-DIS.                                                          MP3PROG
425*  000387       DISPLAY "                L O G O S                           MP3PROG
426*  000388-      "                  " LINE 01 POSITION 01 ERASE.              MP3PROG
427*  000389       DISPLAY "(P)ROCESS / (U)PDATE ?  *
428*  000390-      "                         " LINE 02 POSITION 01         .
429*               DISPLAY " D = DISC INPUT " LINE 3 POSITION 14.
430*               DISPLAY "   = INQUIRE LIB" LINE 4 POSITION 14.
431*               DISPLAY " X = DISC IN/NO CHG" LINE 5 POSITION 14.
432*               DISPLAY " Y= LIB/IN FROM DISC" LINE 6 POSITION 14.
433*               DISPLAY " Z= LIB/OUT TO DISC" LINE 7 POSITION 14.
434*               DISPLAY " E = END OF JOB" LINE 9 POSITION 14.
435*           ACCEPT PROC-TYPE LINE 2 POSITION 25 PROMPT ECHO.
436*           IF PROC-TYPE = "I" GO TO PROC-1.
437*               IF PROC-TYPE-X = "Y" GO TO SCRN-DIS-1.
438*           OPEN I-O SYSLIBL .
439*               MOVE "Y" TO PROC-TYPE-X.
440*           SCRN-DIS-1.
441*               IF PROC-TYPE = "P" GO TO PROC-P.
442*               IF PROC-TYPE = "U" GO TO PROC-U.
443*                IF PROC-TYPE = "D" GO TO PROC-D.
444*                 IF PROC-TYPE = "X" GO TO PROC-O.
445*                  IF PROC-TYPE = "E" GO TO EOJ.
446*                   IF PROC-TYPE  = "I" GO TO PROC-U.
447*                IF PROC-TYPE = "Y" GO TO PROC-LIB-IN.
448*                IF PROC-TYPE = "Z" GO TO PROC-LIB-OUT.
449*           CLOSE SYSLIBL .
450*               MOVE "N" TO  PROC-TYPE-X.
451*             GO TO SCRN-DIS.
452*           PROC-1.
453*               OPEN OUTPUT SYSLIBL.
454*               CLOSE SYSLIBL.
455*               GO TO SCRN-DIS.
456*           PROC-U.
457*  000393      DISPLAY "        MACRO NAME                                   MP3PROG
458*  000394-     "                          " LINE 04 POSITION 01 ERASE.
459*  000395      DISPLAY "..........1..........2..........3..........4.........5..MP3PROG
460*  000396-     "........6..........7..........8" LINE 07 POSITION 01     .   MP3PROG
461*           PROC-U-E.
```

```
462*                         GO TO ACPT-KEYS.
463*            /
464*        ACPT-FUNC.
465*                 DISPLAY "FUNC: ADD,CH#,INS,DEL,END" LINE 6 POSITION 01.
466*  000400        ACCEPT FUNCTION LINE 6 POSITION 35 PROMPT ECHO.            MPBPROG
467*  000401        IF FUNCTION = "ADD" GO TO ADD-RT.                          MPBPROG
468*  000402        IF FUNCTION = "A  " GO TO ADD-RT.                          MPBPROG
469*  000403        IF FUNCTION = "CHG" GO TO CHG-RT.                          MPBPROG
470*  000404        IF FUNCTION = "C  " GO TO CHG-RT.                          MPBPROG
471*                IF FUNCTION = "CH1" GO TO CHG-RT.
472*                IF FUNCTION = "CH2" GO TO CHG-RT.
473*                IF FUNCTION = "CH3" GO TO CHG-RT.
474*                IF FUNCTION = "CH4" GO TO CHG-RT.
475*                IF FUNCTION = "CHA" GO TO CHG-RT.
476*                IF FUNCTION = "INS" GO TO SYS-LIB-KEY-IN-Q.
477*                IF FUNCTION = "I  " GO TO SYS-LIB-KEY-IN-Q.
478*  000405        IF FUNCTION = "DEL" GO TO DEL-RT.                          MPBPROG
479*  000406        IF FUNCTION = "D  " GO TO DEL-RT.                          MPBPROG
480*        ACPT-FUNC-1.
481*  000409        IF FUNCTION = "END" GO TO SCRN-DIS.                        MPB
482*  000410        IF FUNCTION = "E  " GO TO SCRN-DIS.                        MPB
483*  000411        IF FUNCTION = "*  " GO TO SCRN-DIS.                        MPB
484*  000412        GO TO ACPT-FUNC.                                           MPBPROG
485*  000413 EOJ.                                                              MPBPROG
486*                 DISPLAY "EOJ - LOGOS " LINE 1 POSITION 1 ERASE.
487*  000415        CLOSE   SYSLIBL    .                                       MPBPROG
488*  000416        STOP RUN.                                                  MPBPROG
489*  000417 CHG-RT.                                                           MPBPROG
490*                IF FUNCTION = "CH1" PERFORM SYS-LIB-KEY-IN-Q GO TO ACPT-FUNC.
491*                IF FUNCTION = "CH2" PERFORM SYS-LIB-KEY-IN-B GO TO ACPT-FUNC.
492*                IF FUNCTION = "CH3" PERFORM SYS-LIB-KEY-IN-T GO TO ACPT-FUNC.
493*                IF FUNCTION = "CH4" PERFORM SYS-LIB-KEY-IN-X GO TO ACPT-FUNC.
494*                IF FUNCTION = "CHA" GO TO CHG-RT-I.
495*                IF PROC-TYPE = "J" GO TO CHG-RT-I-2.
496*                MOVE 1 TO FCT.
497*  000419        GO TO ACPT-KEYS-1.                                         MPBPRO
498*        CHG-RT-I.
499*                PERFORM SYS-LIB-KEY-IN-Q THRU SYS-LIB-KEY-IN-X.
500*                GO TO ACPT-FUNC.
501*        CHG-RT-I-2.
502*                MOVE 2 TO FCT.
503*                GO TO ACPT-KEYS-1.
504*  000420 DEL-RT.                                                           MPBPROG
505*                IF PROC-TYPE NOT EQUAL TO "U" GO TO ACPT-KEYS-1.
506*  000421        MOVE 3 TO FCT.                                             MPBPROG
507*  000422        GO TO ACPT-KEYS-1.                                         MPBPRO
508*  000426 ADD-RT.                                                           MPBPROG
509*  000427        MOVE 1 TO FCT .                                            MPBPROG
510*                GO TO ACPT-KEYS-1.
511*            /
512*  000428 ACPT-KEYS.                                                        MPBPROG
513*  000429        MOVE LOW-VALUES TO FREC.                                   MPBPROG
514*  000430*PLACE DEFAULT VALUES INTO RECORD HERE                             MPBPROG
515*        SYS-LIB-KEY-IN-N.
516*                MOVE "052504" TO XWA-PKT.
517*                PERFORM XPA-ACPTA.
518*                MOVE XWA-ALPHA TO SYSLIB-N.
519*                DISPLAY SYSLIB-N LINE 06 POSITION 45.
520*                IF SYSLIB-N = "END " GO TO SCRN-DIS.
521*                IF SYSLIB-N = "E   " GO TO SCRN-DIS.
522*        SYS-LIB-KEY-IN-N-1.
523*                IF PROC-TYPE = "U" GO TO SYS-LIB-KEY-IN-Q.
524*                MOVE "000000" TO SYSLIB-Q.
525*                MOVE SYSLIB-Q TO SYSLIB-Q-W-1.
526*                MOVE SYSLIB-N TO SYSLIB-NT.
527*                START SYSLIBL INVALID KEY GO TO ACPT-KEYS-2.
528*                IF PROC-TYPE = "I" GO TO DISPL-REC-NEXT-2.
529*                GO TO ACPT-FUNC.
530*        ACPT-KEYS-2.
531*                IF PROC-TYPE = "X" GO TO ACPT-FUNC.
532*                DISPLAY "INV/M" LINE 6 POSITION 30.
533*                GO TO ACPT-KEYS.
534*        ACPT-KEYS-1.
535*                GO TO READ-FILE.
536*            /
537*        PROC-D.
538*                IF SYSIN-SW = "Y" GO TO PROC-U.
539*                OPEN INPUT SYSINL.
540*                MOVE "Y" TO SYSIN-SW.
```

```
541*                    MOVE 1 TO FCT.
542*                    GO TO PROC-U.
543*           PROC-D-1.
544*                    IF FUNCTION = "INS" GO TO PROC-D-2.
545*                    IF FUNCTION = "I  " GO TO PROC-D-2.
546*                    READ SYSINL INTO SYSINRC AT END GO TO PROC-D-EOJ.
547*           PROC-D-2.
548*                    MOVE 1 TO FCT.
549*                    MOVE SYSINREC TO SYSIN-W.
550*                    MOVE SYSINW-Q TO SYSLIB-Q.
551*                    MOVE SYSINW-B TO SYSLIB-B.
552*                    MOVE SYSINW-T TO SYSLIB-T.
553*                    MOVE SYSINW-X TO SYSLIB-X.
554*                    GO TO DISPL-REC.
555*           PROC-D-EOJ.
556*                    CLOSE SYSINL.
557*                    MOVE "N" TO SYSIN-SW.
558*                    GO TO SCRN-DIS.
559*      /
560*           PROC-LIB-IN.
561*                    IF SYSIN-SW = "Y" GO TO PROC-LIB-IN-1.
562*                    OPEN INPUT SYSINL.
563*                    MOVE "Y" TO SYSIN-SW.
564*                    MOVE 1 TO FCT.
565*           PROC-LIB-IN-1.
566*                    READ SYSINL INTO SYSINRC AT END GO TO PROC-D-EOJ.
567*                    MOVE SYSINREC TO SYSIN-W.
568*                    MOVE SYSINW-Q TO SYSLIB-Q.
569*                    MOVE SYSINW-B TO SYSLIB-B.
570*                    MOVE SYSINW-T TO SYSLIB-T.
571*                    MOVE SYSINW-X TO SYSLIB-X.
572*                      IF SYSLIB-Q = "000000" GO TO PROC-LIB-IN-3.
573*                    GO TO READ-FILE.
574*           PROC-LIB-IN-3.
575*                    MOVE SYSINW-NT TO SYSLIB-N.
576*                    GO TO READ-FILE.
577*      /
578*           PROC-LIB-OUT.
579*                    IF SYSIN-SW = "X" GO TO PROC-LIB-OUT-2.
580*                    IF SYSIN-SW = "Y" GO TO PROC-LIB-OUT-1-0.
581*                    MOVE "Y" TO SYSIN-SW. OPEN OUTPUT SYSINL.
582*           PROC-LIB-OUT-1-0.
583*                    DISPLAY "MACRO OUT" LINE 1 POSITION 1, ERASE.
584*                    ACCEPT MACLIB-N LINE 1 POSITION 12, PROMPT ECHO.
585*                    IF MACLIB-N = "END  " GO TO PROC-D-EOJ.
586*                    IF MACLIB-N = "E    " GO TO PROC-D-EOJ.
587*                    MOVE "000000" TO SYSLIB-Q.
588*                       MOVE MACLIB-N TO SYSLIB-N.
589*                    IF MACLIB-N = "ALL  " GO TO PROC-LIB-OUT-5.
590*           PROC-LIB-OUT-1.
591*                    READ SYSLIBL INVALID KEY GO TO PROC-LIB-OUT-6.
592*                       GO TO PROC-LIB-OUT-2-0.
593*           PROC-LIB-OUT-2.
594*                    READ SYSLIBL NEXT RECORD AT END GO TO PROC-D-EOJ.
595*           PROC-LIB-OUT-2-0.
596*                    MOVE SYSLIB-Q TO SYSINW-Q.
597*                    MOVE SYSLIB-B TO SYSINW-B.
598*                    MOVE SYSLIB-T TO SYSINW-T.
599*                    MOVE SYSLIB-X TO SYSINW-X.
600*                    IF SYSINW-Q = "000000" GO TO PROC-LIB-OUT-4.
601*           PROC-LIB-OUT-3.
602*                    MOVE SYSIN-W TO SYSINREC.
603*                    WRITE SYSINREC.
604*                    GO TO PROC-LIB-OUT-2.
605*           PROC-LIB-OUT-4.
606*                    IF SYSIN-SW = "Y" GO TO PROC-LIB-OUT.
607*                    MOVE SYSLIB-N TO SYSINW-NT.
608*                    GO TO PROC-LIB-OUT-3.
609*           PROC-LIB-OUT-5.
610*                    MOVE "X" TO SYSIN-SW.
611*                    MOVE "     " TO SYSLIB-N.
612*                    GO TO PROC-LIB-OUT-1.
613*           PROC-LIB-OUT-6.
614*                    IF SYSLIB-N = "     " GO TO PROC-LIB-OUT-2.
615*                    GO TO PROC-LIB-OUT.
616*      /
617*           SYS-LIB-KEY-IN-Q.
618*                    MOVE "060108" TO XWA-PKT.
619*                    PERFORM XPA-ACPTA.
```

```
620*              IF XWA-STAT IS = 2 GO TO SYS-LIB-KEY-IN-N.
621*              MOVE XWA-ALPHA TO SYSLIB-Q.
622*              DISPLAY SYSLIB-Q LINE 08 POSITION 01.
623*          SYS-LIB-KEY-IN-B.
624*              MOVE "010708" TO XWA-PKT.
625*              PERFORM XPA-ACPTA.
626*              IF XWA-STAT IS = 2 GO TO SYS-LIB-KEY-IN-Q.
627*              MOVE XWA-ALPHA TO SYSLIB-B.
628*              DISPLAY SYSLIB-B LINE 08 POSITION 07.
629*          SYS-LIB-KEY-IN-T.
630*              MOVE "720808" TO XWA-PKT.
631*              PERFORM XPA-ACPTA.
632*              IF XWA-STAT IS = 2 GO TO SYS-LIB-KEY-IN-B.
633*              MOVE XWA-ALPHA TO SYSLIB-T.
634*              DISPLAY SYSLIB-T LINE 08 POSITION 08.
635*          SYS-LIB-KEY-IN-X.
636*              MOVE "018008" TO XWA-PKT.
637*              PERFORM XPA-ACPTA.
638*              IF XWA-STAT IS = 2 GO TO SYS-LIB-KEY-IN-T.
639*              MOVE XWA-ALPHA TO SYSLIB-X.
640*              DISPLAY SYSLIB-X LINE 08 POSITION 80.
641*          SYS-LIB-KEY-IN-X-1.
642*              DISPLAY BLANK80 LINE 9 POSITION 1.
643*              GO TO ACPT-FUNC.
644*      /
645*          DISPL-REC.
646*              DISPLAY SYSLIB-Q LINE 9 POSITION 1.
647*              DISPLAY SYSLIB-B LINE 9 POSITION 7.
648*              DISPLAY SYSLIB-T LINE 9 POSITION 8.
649*              DISPLAY SYSLIB-X LINE 9 POSITION 80.
650*              DISPLAY BLANK80 LINE 8 POSITION 1.
651*          DISPL-REC-NEXT.
652*              DISPLAY "NEXT RECORD ?" LINE 15 POSITION 52.
653*              IF PROC-TYPE = "X" GO TO ACPT-KEYS-1.
654*              ACCEPT RESPONSE2 LINE 15 POSITION 63.
655*              IF RESPONSE2 = "Y" GO TO DISPL-REC-NEXT-2.
656*              IF PROC-TYPE = "I" GO TO SCRN-DIS.
657*              GO TO ACPT-FUNC.
658*          DISPL-REC-NEXT-2.
659*              IF PROC-TYPE = "D" GO TO PROC-D-1.
660*              READ SYSLIBL NEXT RECORD AT END GO TO SCRN-DIS.
661*              IF SYSLIB-N = SYSLIB-NT GO TO DISPL-REC.
662*              GO TO ACPT-KEYS.
663*      /
664* 000433 READ-FILE.                                                MPBPROG
665* 000434     READ   SYSLIBL      INVALID KEY GO TO CHECK1.         MPBPROG
666* 000435     IF UW-STAT = "99" MOVE "00" TO UW-STAT GO TO READ-FILE. MPBPROG
667* 000436     IF FCT = 2 GO TO RD1.                                  MPBPROG
668* 000437     IF FCT = 3 GO TO RD1.                                  MPBPROG
669* 000438     IF FCT = 4 GO TO RD1.                                  MPBPROG
670* 000439     MOVE "ALREADY ON FILE" TO XWE-ERR.                     MPBPROG
671* 000440     PERFORM XPE-ERR.                                       MPBPROG
672* 000441     GO TO READ-FILE-EXIT.                                  MPB
673* 000442 CHECK1.                                                    MPBPROG
674* 000443     IF FCT = 1 GO TO RD1.                                  MPBPROG
675* 000444     MOVE "NOT ON FILE" TO XWE-ERR.                         MPBPROG
676* 000445     PERFORM XPE-ERR.                                       MPBPROG
677*            GO TO READ-FILE-EXIT.
678* 000447 RD1.                                                       MPBPROG
679*            IF FCT = 1 GO TO ALLOK-RT.
680*            GO TO DOK2.
681* 000450 ALLOK-RT.                                                  MPBPROG
682*            IF PROC-TYPE = "X" GO TO DOK2.
683*            IF PROC-TYPE = "Y" GO TO DOK2.
684* 000451     DISPLAY "DATA OK?(YES,CAN)" LINE 15 POSITION 47.       MPBPROG
685* 000454     ACCEPT RESPONSE LINE 15 POSITION 78 PROMPT ECHO.       MPBPROG
686* 000455     IF RESPONSE = "YES" GO TO DOK2.                        MPBPROG
687* 000456     IF RESPONSE = "Y " GO TO DOK2.                         MPBPROG
688*            IF RESPONSE = "CAN" GO TO READ-FILE-EXIT.
689*            IF RESPONSE = "C " GO TO READ-FILE-EXIT.
690* 000461     GO TO ALLOK-RT.                                        MPBPROG
691* 000462 DOK2.                                                      MPBPROG
692* 000463     IF FCT = 1 GO TO WRITE-RT.                             MPBPROG
693*            IF FCT = 2 GO TO CHG-RT-1.
694* 000364     IF FCT = 3 GO TO DEL-RT2.                              MPBPROG
695*            GO TO READ-FILE-EXIT.
696*        CHG-RT-1.
697*            IF PROC-TYPE NOT EQUAL "U" GO TO CHG-RT-ER.
698*            REWRITE FREC INVALID KEY GO TO CHG-RT-ER.
```

```
699*                    GO TO READ-FILE-EXIT.
700*            CHG-RT-ER.
701*   000466       MOVE "INVALID REWRITE" TO XWE-ERR                        MP3PROG
702*   000467       PERFORM XPE-ERRSP.                                       MP3PROG
703*                GO TO READ-FILE-EXIT.
704*   000470   WRITE-RT.                                                    MP3PROG
705*   000471       WRITE FREC.                                              MP3PROG
706*            WRITE-RT-E.
707*                GO TO READ-FILE-EXIT.
708*   000474   DEL-RT2.                                                     MP3PROG
709*                IF PROC-TYPE NOT EQUAL TO "U" GO TO DEL-RT2-ER.
710*                DELETE SYSLIBL INVALID KEY GO TO DEL-RT2-ER.
711*                GO TO READ-FILE-EXIT.
712*            DEL-RT2-ER.
713*   000476       MOVE "INVALID DELETE" TO XWE-ERR                         MP3PROG
714*   000477       PERFORM XPE-ERRSP.                                       MP3PROG
715*   000479       GO TO READ-FILE-EXIT   .
716*            READ-FILE-EXIT.
717*                    IF PROC-TYPE = "Y" GO TO PROC-LIB-IN-1.
718*                    IF PROC-TYPE = "D" GO TO PROC-D-1.
719*                    IF PROC-TYPE = "X" GO TO PROC-D-1.
720*                    IF PROC-TYPE = "I" GO TO DISPL-REC-NEXT.
721*                    IF PROC-TYPE = "P" GO TO READ-FILE-EXIT-1.
722*                    IF MEDIA-1 = "S" GO TO READ-FILE-EXIT-1.
723*                    GO TO ACPT-KEYS.
724*            READ-FILE-EXIT-1.
725*                    MOVE "Y" TO Y-SW.
726*            READ-FILE-EXIT-2.
727*        /
728*            PROC-P.
729*                OPEN OUTPUT SYSOUTL.
730*                    MOVE "N" TO INPUT-SCR-IN EXPANSION END-OF-INPUT.
731*                MOVE "N" TO CONTINUE-1 SPECIAL.
732*                MOVE 1 TO  PAR-COU RECOR-COU.
733*                SET PARM-CO TO 1.
734*            EBLK1.
735*                DISPLAY " L O G O S - P R O C E S S " LINE 1
736*                        POSITION 1 ERASE.
737*                DISPLAY "INPUT PARM MEDIA" LINE 2 POSITION 1.
738*                    DISPLAY " L= LIBRARY INPUT" LINE 3 POSITION 1.
739*                    DISPLAY " D= SOURCE CODE INPUT" LINE 4 POSITION 1.
740*                    DISPLAY " R= SCREEN INPUT RANDOM" LINE 5 POSITION 1.
741*                    DISPLAY " S= SCREEN INPUT SEQ." LINE 6 POSITION 1.
742*                ACCEPT MEDIA-1 LINE 2 POSITION 19 PROMPT ECHO.
743*            EBLK2.
744*                IF EXPANSION = "Y" GO TO EBLK2X.
745*                    IF MEDIA-1 = "L" GO TO SCRN-INPUT-PARM.
746*                    IF MEDIA-1 = "D" GO TO DISC-INPUT-PARM-P.
747*                IF MEDIA-1 = "S" GO TO SCRN-INPUT-PARM.
748*                    IF MEDIA-1 = "R" GO TO SCRN-INPUT-PARM.
749*                    DISPLAY "INVALID MED." LINE 2 POSITION 1.
750*                    GO TO EBLK1.
751*            EBLK2X.
752*                GO TO EBLK3.
753*            EBLK3.
754*                IF END-OF-INPUT = "Y" GO TO EBLK5.
755*                IF EXPANSION = "Y" GO TO SBLK2X.
756*                    IF MEDIA-1 = "S" GO TO SBLK2X.
757*                    IF MEDIA-1 = "L" GO TO SBLK2X.
758*                    IF MEDIA-1 = "R" GO TO SBLK2X.
759*            EBLK4.
760*            EBLK4X.
761*                    IF EXPANSION NOT EQUAL "Y" GO TO EBLK4-D.
762*                MOVE OUTRECB TO SYSOUREC.
763*            EBLK4-W.
764*                WRITE SYSOUREC.
765*                GO TO EBLK2.
766*            EBLK5.
767*                CLOSE SYSOUTL.
768*                GO TO SCRN-DIS.
769*            EBLK4-D.
770*                    IF MEDIA-1 NOT EQUAL "D" GO TO EBLK2.
771*                MOVE SYSINPREC TO SYSOUREC.
772*                GO TO EBLK4-W.
773*        /
774*            SCRN-INPUT-PARM.
775*                IF INPUT-SCR-IN = "Y" GO TO  SCRN-INPUT-PARM-1-3.
776*                DISPLAY "SCREEN INPUT  PARAMETERS" LINE 1 POSITION 1 ERASE.
777*                    DISPLAY "Y= END-OF-IN" LINE 1 POSITION 57.
```

```
778*          ACCEPT END-OF-INPUT LINE 1 POSITION 70 PROMPT ECHO.
779*      SCRN-INPUT-PARM-0.
780*          MOVE "   " TO SYSLIB-N.
781*          IF END-OF-INPUT = "Y" GO TO INPUT-PARM-3.
782*              MOVE 1 TO PAR-COU.
783*      CLEAR-TABLE-PARM-1.
784*          SET PARM-CO TO PAR-COU.
785*          MOVE BLANK10 TO PARM-CARD (PARM-CO)
786*          ADD 1 TO PAR-COU.
787*          IF PAR-COU > 50 GO TO CLEAR-TABLE-PARM-2.
788*              GO TO CLEAR-TABLE-PARM-1.
789*      CLEAR-TABLE-PARM-2.
790*          DISPLAY "PARMS TO SAVE(0)" LINE 2 POSITION 1.
791*          ACCEPT SYSLIB-N LINE 2 POSITION 20 PROMPT ECHO.
792*              MOVE "Y" TO INPUT-SCR-IN.
793*          MOVE 3 TO LINE-COU.
794*          MOVE 1 TO PAR-COU.
795*              MOVE 8 TO INSPECT-COU.
796*              IF MEDIA-1 = "L" GO TO REST-SCRN-INPUT.
797*      SCRN-INPUT-PARM-1-3.
798*          DISPLAY "PARAMETER:" LINE LINE-COU POSITION 1.
799*              IF MEDIA-1 = "R" GO TO INPUT-PARM-R.
800*          DISPLAY PAR-COU LINE LINE-COU POSITION 12.
801*      SCRN-INPUT-PARM-1-3-0.
802*          MOVE 30 TO LINE-POS-W-2.
803*          MOVE 10 TO LINE-POS-W-1.
804*          MOVE LINE-COU TO LINE-POS-W-3.
805*          MOVE LINE-POS-WK TO XWA-PKT.
806*          PERFORM XPA-ACPTA.
807*          IF XWA-STAT IS = 2 GO TO SCRN-INPUT-PARM-2.
808*          MOVE XWA-ALPHA TO PARM-IN-TAB.
809*      SCRN-INPUT-PARM-1-3-1.
810*              IF PAR-COU > 50 GO TO INPUT-PARM-3.
811*          SET PARM-CO TO PAR-COU.
812*              MOVE PARM-IN-TAB TO PARM-CARD (PARM-CO).
813*          ADD 1 TO PAR-COU.
814*          ADD 1 TO LINE-COU.
815*          IF LINE-COU < 20 GO TO SCRN-INPUT-PARM-2-1.
816*              DISPLAY BLANK80 LINE 1 POSITION 1, ERASE.
817*          MOVE 3 TO LINE-COU.
818*      SCRN-INPUT-PARM-2-1.
819*          IF PARM-IN-TAB = "END      " GO TO INPUT-PARM-3.
820*          GO TO SCRN-INPUT-PARM-1-3.
821*      SCRN-INPUT-PARM-2.
822*          MOVE "N" TO INPUT-SCR-IN.
823*          DISPLAY "MACRO ABORT" LINE LINE-COU POSITION 1.
824*          GO TO SCRN-INPUT-PARM.
825*      INPUT-PARM-R.
826*          ACCEPT PAR-COU LINE LINE-COU POSITION 12 PROMPT ECHO.
827*              GO TO SCRN-INPUT-PARM-1-3-0.
828*      INPUT-PARM-3.
829*          MOVE "N" TO INPUT-SCR-IN.
830*          IF SYSLIB-N NOT EQUAL "     " AND MEDIA-1 = "L"
831*              GO TO EBLK2X.
832*          IF SYSLIB-N = "     " GO TO EBLK2X.
833*          GO TO SAVE-INPUT-SCRN.
834*      /
835*      SAVE-INPUT-SCRN.
836*          MOVE SYSLIB-N TO SYSLIB-NT.
837*          MOVE 8 TO INSPECT-COU.
838*          MOVE "000000" TO SYSLIB-Q.
839*              MOVE 0 TO SYSLIB-Q-W-I.
840*          MOVE BLANK80 TO SYSLIB-T.
841*          MOVE 1 TO FCT  PAR-COU.
842*      SAVE-INPUT-SCRN-1.
843*          PERFORM READ-FILE THRU READ-FILE-EXIT-1.
844*          IF SYSLIB-X = "E" GO TO SAVE-INPUT-SCRN-DONE.
845*          MOVE 1 TO SYSLIBM-SAVE  OUTPARM-W-CO.
846*          MOVE 8 TO INSPECT-COU.
847*      SAVE-INPUT-SCRN-1-1.
848*          SET PARM-CO TO PAR-COU.
849*          MOVE PARM-CARD (PARM-CO) TO PARM-IN-TAB.
850*              ADD 1 TO PAR-COU.
851*              MOVE PARM-IN-TAB TO PARM-IN-TAB-W.
852*          MOVE 1 TO OUTPARM-W-CO.
853*      SAVE-INPUT-SCRN-2.
854*          SET OUTPARM TO OUTPARM-W-CO.
855*          SET INSPECT-CO TO INSPECT-COU.
856*          MOVE PARM-IN-TAB-I (OUTPARM) TO INRECA-I (INSPECT-CO).
```

```
857*              ADD 1 TO OUTPARM-W-CO.
858*              ADD 1 TO INSPECT-COU.
859*              IF OUTPARM-W-CO > 10 GO TO SAVE-INPUT-SCRN-3.
860*              GO TO SAVE-INPUT-SCRN-2.
861*      SAVE-INPUT-SCRN-3.
862*              ADD 1 TO SYSLIBM-SAVE.
863*              IF SYSLIBM-SAVE > 5 GO TO SAVE-INPUT-SCRN4.
864*              GO TO SAVE-INPUT-SCRN-1-1.
865*      SAVE-INPUT-SCRN-4.
866*              ADD 1 TO SYSLIB-Q-W-I.
867*              MOVE INRECA TO WREC-1.
868*          IF PARM-IN-TAB = "END       " MOVE "E" TO WREC-1-2-1
869*              ELSE MOVE "M" TO WREC-1-2-1.
870*              MOVE SYSLIB-Q-W-I TO WREC-1-1.
871*              MOVE SYSLIB-NT TO WREC-0.
872*              MOVE WREC TO FREC.
873*          IF PARM-IN-TAB = "END       " MOVE "E" TO SYSLIB-X.
874*              GO TO SAVE-INPUT-SCRN-1.
875*      SAVE-INPUT-SCRN-DONE.
876*              MOVE "N" TO INPUT-SCR-IN.
877*              GO TO EBLK2X.
878*      /
879*      REST-SCRN-INPUT.
880*              MOVE 8 TO INSPECT-COU.
881*              MOVE "000000" TO SYSLIB-Q.
882*              MOVE 1 TO PAR-COU.
883*              START SYSLIBL INVALID KEY GO TO REST-SCRN-NOT-F.
884*      REST-SCRN-INPUT-1.
885*              READ SYSLIBL NEXT AT END GO TO REST-SCRN-DONE.
886*              MOVE FREC TO WREC.
887*      REST-PARM-INPUT-DISC.
888*          IF WREC-1-1 = "000000" GO TO REST-SCRN-INPUT-1.
889*              MOVE WREC-1 TO INRECA.
890*          MOVE 1 TO OUTPARM-W-CO SYSLIBM-SAVE.
891*              MOVE 8 TO INSPECT-COU.
892*      REST-SCRN-INPUT-2.
893*              IF PAR-COU > 50 GO TO REST-SCRN-INPUT-3-1.
894*              SET INSPECT-CO TO INSPECT-COU.
895*              SET OUTPARM TO OUTPARM-W-CO.
896*              MOVE INRECA-I (INSPECT-CO) TO PARM-IN-TAB-I (OUTPARM).
897*              ADD 1 TO INSPECT-COU.
898*              ADD 1 TO OUTPARM-W-CO.
899*              IF OUTPARM-W-CO > 10 GO TO REST-SCRN-INPUT-3.
900*              GO TO REST-SCRN-INPUT-2.
901*      REST-SCRN-INPUT-3.
902*              ADD 1 TO SYSLIBM-SAVE.
903*              MOVE 1 TO OUTPARM-W-CO.
904*              IF SYSLIBM-SAVE > 6 GO TO REST-SCRN-INPUT-3-1.
905*              SET PARM-CO TO PAR-COU.
906*              MOVE PARM-IN-TAB-W TO PARM-IN-TAB.
907*              MOVE PARM-IN-TAB TO PARM-CARD (PARM-CO).
908*              ADD 1 TO PAR-COU.
909*              GO TO REST-SCRN-INPUT-2.
910*      REST-SCRN-INPUT-3-1.
911*              IF SYSIND-SW = "Y" GO TO REST-SCRN-EXIT.
912*              IF SYSLIB-X = "E" GO TO REST-SCRN-DONE.
913*              GO TO REST-SCRN-INPUT-1.
914*      REST-SCRN-NOT-F.
915*              DISPLAY "MACRO NOT FOUND" LINE 3 POSITION 1.
916*              MOVE "N" TO INPUT-SCR-IN.
917*              GO TO SCRN-INPUT-PARM.
918*      REST-SCRN-DONE.
919*              MOVE "N" TO INPUT-SCR-IN.
920*              MOVE "Y" TO EXPANSION.
921*              MOVE 1 TO PAR-COU.
922*              DISPLAY "RESTORED MACRO" LINE 1 POSITION 1 ERASE.
923*              ACCEPT Y-SW LINE 1 POSITION 20 PROMPT ECHO.
924*              IF Y-SW = "Y" GO TO REST-SCRN-DONE-D-1.
925*              GO TO REST-SCRN-DONE-D-3.
926*      REST-SCRN-DONE-D-1.
927*              SET PARM-CO TO PAR-COU.
928*              MOVE PARM-CARD (PARM-CO) TO PARM-IN-TAB.
929*              DISPLAY PARM-IN-TAB LINE 3 POSITION 1.
930*              DISPLAY PAR-COU LINE 3 POSITION 15.
931*              ADD 1 TO PAR-COU.
932*              IF PAR-COU > 50 GO TO REST-SCRN-DONE-D-3.
933*          IF PARM-IN-TAB = "END       " GO TO REST-SCRN-DONE-D-3.
934*              GO TO REST-SCRN-DONE-D-1.
935*      REST-SCRN-DONE-D-3.
```

```
936*                       GO TO EBLK2X.
937*           REST-SCRN-EXIT.
938*                       MOVE "Y" TO Y-SW.
939*           REST-SCRN-EXIT-1.
940*          /
941*           DISC-INPUT-PARM-P.
942*                       IF SYSIND-SW = "Y" GO TO DISC-INPUT-PARM-P-1.
943*                         MOVE "Y" TO SYSIND-SW.
944*                         MOVE "N" TO MACRO-INPUT-SW.
945*                         OPEN INPUT SYSINPL.
946*           DISC-INPUT-PARM-P-1.
947*                       READ SYSINPL INTO SYSINPREC AT END GO TO DIS-I-DONE.
948*                       MOVE SYSINPREC TO INRECA.
949*                       MOVE 7 TO INSPECT-COU.
950*                       SET INSPECT-CO TO INSPECT-COU.
951*                       MOVE INRECA-I (INSPECT-CO) TO INSPECTOR2.
952*                       IF INSPECTOR2 = "M" GO TO DISC-INPUT-MACRO-B.
953*                       IF INSPECTOR2 = "E" GO TO DISC-INPUT-MACRO-E.
954*                       IF MACRO-INPUT-SW = "Y" GO TO DISC-INPUT-MACRO-E-1.
955*                       GO TO EBLK2X.
956*           DISC-INPUT-MACRO.
957*                       MOVE "Y" TO MACRO-INPUT-SW.
958*           DISC-INPUT-MACRO-1.
959*                       MOVE 8 TO INSPECT-COU.
960*                       PERFORM REST-PARM-INPUT-DISC THRU REST-SCRN-EXIT.
961*                       GO TO DISC-INPUT-PARM-P-1.
962*           DISC-INPUT-MACRO-E.
963*                       MOVE "Y" TO EXPANSION.
964*           DISC-INPUT-MACRO-E-1.
965*                       MOVE "N" TO MACRO-INPUT-SW.
966*                       GO TO EBLK2X.
967*           DIS-I-DONE.
968*               MOVE "Y" TO END-OF-INPUT.
969*               CLOSE SYSINPL.
970*               GO TO EBLK2X.
971*           DISC-INPUT-MACRO-B.
972*                    MOVE 1 TO PAR-COU.
973*           DISC-INPUT-MACRO-B-1.
974*                   SET PARM-CO TO PAR-COU.
975*                   MOVE BLANK10 TO PARM-CARD (PARM-CO).
976*                   ADD 1 TO PAR-COU.
977*                   IF PAR-COU > 50 GO TO DISC-INPUT-MACRO.
978*                   GO TO DISC-INPUT-MACRO-B-1.
979*          /
980*           SBLK2.
981*                GO TO EBLK4X.
982*           SBLK2X.
983*                IF EXPANSION = "Y" GO TO EXPANSION-BEGIN.
984*          *    CHECK THIS VS PREV
985*                   IF MEDIA-1 = "S" GO TO SBLK3.
986*                   IF MEDIA-1 = "L" GO TO SBLK3.
987*                   IF MEDIA-1 = "R" GO TO SBLK3.
988*                GO TO SBLK2.
989*           SBLK3.
990*                   MOVE "Y" TO EXPANSION.
991*                   GO TO EXPANSION-BEGIN.
992*          /
993*           EXPANSION-BEGIN.
994*                IF SPECIAL = "Y" GO TO SPECIAL-1.
995*                IF CONTINUE-1 = "Y" GO TO EXPANSION-GET.
996*                   SET PARM-CO TO 1.
997*                   MOVE PARM-CARD (PARM-CO) TO PARM-IN-TAB.
998*                   MOVE PARM-IN-TAB TO SYSLIB-N.
999*                MOVE "000000" TO SYSLIB-Q.
1000*              START SYSLIBL INVALID KEY GO TO EXPANSION-NOT-FOUND.
1001*              MOVE "Y" TO CONTINUE-1.
1002*          EXPANSION-GET.
1003*              READ SYSLIBL NEXT AT END GO TO EXPANSION-DONE.
1004*                  IF SYSLIB-X = "B" GO TO EXPANSION-GET.
1005*              IF SYSLIB-X = "E" GO TO EXPANSION-DONE.
1006*                  IF SYSLIB-Q = "000000" GO TO EXPANSION-GET.
1007*                  MOVE 0 TO INSPECT-COU COUNT-OUT.
1008*              MOVE FREC TO WREC.
1009*                  MOVE "          " TO WREC-1-1.
1010*              MOVE WREC-1 TO INRECA.
1011*                  MOVE BLANK80 TO OUTRECB.
1012*          INNER-LOOP.
1013*                  MOVE 0 TO INSPECT-TAL.
1014*              IF SYSLIB-X = "-" GO TO OUTERLOOP-I-O.
```

```
1015*          INSPECT INRECA TALLYING INSPECT-TAL FOR ALL "Y".
1016*          IF INSPECT-TAL > 0  GO TO POS-IS-TRIPLET.
1017*          GO TO OUTERLOOP-I-O.
1018*      POS-IS-TRIPLET.
1019*          MOVE 0 TO INSPECT-TAL.
1020*          INSPECT INRECA TALLYING INSPECT-TAL FOR CHARACTERS
1021*              BEFORE INITIAL "Y".
1022*      INNER-LOOP-1.
1023*          ADD 1 TO INSPECT-COU .
1024*          ADD 1 TO COUNT-OUT.
1025*          IF INSPECT-COU > INSPECT-TAL GO TO LOOK-FOR-TRIPLET.
1026*          IF COUNT-OUT > 80 GO TO OUTERLOOP-O.
1027*          PERFORM WALK-THRU-I-O.
1028*          GO TO INNER-LOOP-1.
1029*      INNER-LOOP-2.
1030*          PERFORM WALK-THRU-I-O.
1031*          ADD 1 TO INSPECT-COU.
1032*          ADD 1 TO COUNT-OUT.
1033*          IF INSPECT-COU > INSPECT-TAL GO TO LOOK-FOR-TRIPLET.
1034*          IF COUNT-OUT > 80 GO TO OUTERLOOP-O.
1035*          GO TO INNER-LOOP-2.
1036*      LOOK-FOR-TRIPLET.
1037*          ADD 1 TO INSPECT-TAL.
1038*          IF INSPECT-TAL > 80 GO TO OUTERLOOP.
1039*          SET INSPECT-CO TO INSPECT-TAL.
1040*          MOVE INRECA-I (INSPECT-CO) TO INSPECTOR.
1041*          IF INSPECTOR = "Y" GO TO LOOK-FOR-TRIPLET-1.
1042*      LOOK-FOR-TRIPLET-2.
1043*          PERFORM WALK-THRU-I-O.
1044*          ADD 1 TO COUNT-OUT.
1045*          ADD 1 TO INSPECT-COU.
1046*          IF COUNT-OUT > 80 GO TO OUTERLOOP-O.
1047*          GO TO LOOK-FOR-TRIPLET.
1048*      LOOK-FOR-TRIPLET-1.
1049*          ADD 1 TO INSPECT-TAL.
1050*          IF INSPECT-TAL > 80 GO TO OUTERLOOP.
1051*          SET INSPECT-CO TO INSPECT-TAL.
1052*          MOVE INRECA-I (INSPECT-CO) TO INSPECTOR.
1053*          IF INSPECTOR = " " GO TO INNER-LOOP-2.
1054*          IF INSPECTOR < "9" GO TO YOU-HAVE-TRIPLET.
1055*          SUBTRACT 1 FROM INSPECT-TAL.
1056*              GO TO LOOK-FOR-TRIPLET-2.
1057*
1058*      YOU-HAVE-TRIPLET.
1059*          ADD 1 TO INSPECT-TAL.
1060*          MOVE 0 TO FETCH-CO.
1061*          IF INSPECT-TAL > 80 GO TO OUTERLOOP.
1062*          SET INSPECT-CO TO INSPECT-TAL.
1063*          MOVE INRECA-I (INSPECT-CO) TO INSPECTOR2.
1064*          INSPECT TABLE-A TALLYING FETCH-CO FOR CHARACTERS BEFORE
1065*              INITIAL INSPECTOR2.
1066*          IF FETCH-CO < 11 GO TO MPAMODE.
1067*          MOVE 0 TO FETCH-CO.
1068*          INSPECT TABLE-B TALLYING FETCH-CO FOR CHARACTERS BEFORE
1069*              INITIAL INSPECTOR2.
1070*          IF FETCH-CO < 11 GO TO MPBMODE.
1071*          MOVE 0 TO FETCH-CO.
1072*          INSPECT TABLE-AB TALLYING FETCH-CO FOR CHARACTERS BEFORE
1073*              INITIAL INSPECTOR2.
1074*          IF FETCH-CO < 11 GO TO MPABMODE.
1075*          MOVE 0 TO FETCH-CO.
1076*          INSPECT TABLE-NO TALLYING FETCH-CO FOR CHARACTERS BEFORE
1077*              INITIAL INSPECTOR2.
1078*          IF FETCH-CO < 11 GO TO MPNOMODE.
1079*          MOVE 0 TO FETCH-CO.
1080*          INSPECT TABLE-SPECIAL TALLYING FETCH-CO FOR
1081*              CHARACTERS BEFORE INITIAL INSPECTOR2.
1082*          IF FETCH-CO < 11 GO TO SPECIAL-1.
1083*          DISPLAY "ERROR LIB" LINE 23 POSITION 1.
1084*          ACCEPT Y-SW LINE 23 POSITION 10.
1085*          GO TO EXPANSION-DONE.
1086*      OUTERLOOP.
1087*          ADD 1 TO INSPECT-COU .
1088*          ADD 1 TO COUNT-OUT.
1089*          IF INSPECT-COU > 80 GO TO OUTERLOOP-O.
1090*          IF COUNT-OUT > 80 GO TO OUTERLOOP-O.
1091*          PERFORM WALK-THRU-I-O.
1092*          GO TO OUTERLOOP.
1093*      OUTERLOOP-O.
1094*      OUTER-LOOP-O.
```

```
1095*              MOVE 0 TO COUNT-OUT.
1096*              MOVE 0 TO INSPECT-COU.
1097*              IF DIS-I-O = "N" GO TO OUTER-LOOP-D-1.
1098*              DISPLAY INRECA LINE 8 POSITION 1.
1099*              DISPLAY OJTRECB LINE 9 POSITION 1.
1100*              IF DIS-I-O = "D" GO TO OUTER-LOOP-D-0.
1101*              ACCEPT DIS-I-O LINE 10 POSITION 1 PROMPT ECHO.
1102*      OUTER-LOOP-D-0.
1103*              DISPLAY BLANK80 LINE 8 POSITION 1.
1104*              DISPLAY BLANK80 LINE 9 POSITION 1.
1105*              DISPLAY BLANK80 LINE 10 POSITION 1.
1106*      OUTER-LOOP-D-1.
1107*              DISPLAY "REC.CO..." LINE 11 POSITION 1.
1108*              DISPLAY RECOR-COU LINE 11 POSITION 15.
1109*              ADD 1 TO RECOR-COU.
1110*              GO TO SBLK2.
1111*      OUTERLOOP-I-O.
1112*              MOVE INRECA TO OUTRECB.
1113*              GO TO OUTERLOOP-O.
1114*      EXPANSION-DONE.
1115*              MOVE 1 TO COUNT-OUT INSPECT-COU.
1115*              MOVE "N" TO EXPANSION SPECIAL CONTINUE-1.
1117*              GO TO SBLK2.
1118*      WALK-THRU-I-O.
1119*              SET OUTREC-CO TO COUNT-OUT.
1120*              SET INSPECT-CO TO INSPECT-COU.
1121*              MOVE INRECA-I (INSPECT-CO) TO OUTREC-I (OJTREC-CO).
1122*              IF DIS-I-O = "D"
1123*              DISPLAY OUTRECB LINE 18 POSITION 1.
1124*      WALK-THRU-I-O-EXIT.
1125*              MOVE "Y" TO Y-SW.
1126*      WALK-THRU-EXIT-2.
1127*      EXPANSION-NOT-FOUND.
1128*              DISPLAY "MACRO NOT FOUND" LINE 20 POSITION 1.
1129*              DISPLAY "                " LINE 20 POSITION 1.
1130*              ADD 1 TO DIS-COU-ER.
1131*              IF DIS-COU-ER > 10 GO TO EXPANSION-NOT-FOUND-E.
1132*              GO TO EXPANSION-NOT-FOUND.
1133*      EXPANSION-NOT-FOUND-E.
1134*              MOVE 1 TO DIS-COU-ER.
1135*              DISPLAY BLANK80 LINE 20 POSITION 1.
1136*              GO TO EXPANSION-DONE.
1137*      /
1138*      MPAMODE.
1139*              PERFORM FETCH-PARM-OUT .
1140*              IF PARM-IN-TAB = BLANK10 GO TO MPAMODE-1.
1141*              MOVE BLANK80 TO INRECA.
1142*              MOVE BLANK80 TO OUTRECB.
1143*              GO TO EXPANSION-GET.
1144*      MPAMODE-1.
1145*              GO TO MPBMODE-1.
1146*      /
1147*      MPBMODE.
1148*              PERFORM FETCH-PARM-OUT .
1149*              IF PARM-IN-TAB = BLANK10 GO TO MPBMODE-2.
1150*              GO TO MPBMODE-1.
1151*      MPBMODE-2.
1152*              MOVE BLANK80 TO INRECA.
1153*              MOVE BLANK80 TO OUTRECB.
1154*              GO TO EXPANSION-GET.
1155*      MPBMODE-1.
1156*              SUBTRACT 3 FROM INSPECT-TAL.
1157*              MOVE INSPECT-TAL TO INSPECT-COU.
1158*              ADD 1 TO INSPECT-COU.
1159*              MOVE 1 TO BLAN-TRIP.
1160*      MPBMODE-1-1.
1161*              ADD 1 TO INSPECT-TAL.
1162*              ADD 1 TO INSPECT-COU.
1163*              SET INSPECT-CO TO INSPECT-TAL.
1164*              MOVE BLANK1 TO INRECA-I (INSPECT-CO).
1165*              ADD 1 TO BLAN-TRIP.
1166*              IF BLAN-TRIP > 3 GO TO MPBMODE-1-2.
1167*              GO TO MPBMODE-1-1.
1168*      MPBMODE-1-2.
1169*              GO TO LOOK-FOR-TRIPLET.
1170*      /
1171*      MPNOMODE.
1172*              IF COUNT-OUT > 80 GO TO MPBMODE-1-2.
1173*              PERFORM FETCH-PARM-OUT .
1174*              IF PARM-IN-TAB = BLANK10 GO TO MPNOMODE-2.
1175*              MOVE 1 TO OUTPARM-W-CO.
1176*              SET OUTREC-CO TO COUNT-OUT.
```

```
1177*             SET OUTPARM TO 1.
1178*             MOVE PARM-IN-TAB TO PARM-IN-TAB-W.
1179*        MPNOMODE-1.
1180*             MOVE PARM-IN-TAB-I (OUTPARM) TO END-PARM-CK.
1181*             IF END-PARM-CK = "#" GO TO MPNOMODE-1-2.
1182*             MOVE PARM-IN-TAB-I (OUTPARM) TO OUTREC-I (OUTREC-CO).
1183*             ADD 1 TO OUTPARM-W-CO.
1184*             ADD 1 TO COUNT-OUT.
1185*             IF OUTPARM-W-CO > 10 GO TO MPNOMODE-1-2.
1186*             IF COUNT-OUT > 80 GO TO MPNOMODE-1-2.
1187*             SET OUTPARM TO OUTPARM-W-CO.
1188*             SET OUTREC-CO TO COUNT-OUT.
1189*             GO TO MPNOMODE-1.
1190*        MPNOMODE-1-2.
1191*             GO TO MPBMODE-1.
1192*        MPNOMODE-2.
1193*             MOVE 1 TO OUTPARM-W-CO.
1194*        MPNOMODE-2-1.
1195*             SET OUTREC-CO TO COUNT-OUT.
1196*             MOVE "?" TO OUTREC-I (OUTREC-CO)
1197*             ADD 1 TO OUTPARM-W-CO .
1198*             ADD 1 TO COUNT-OUT.
1199*             IF OUTPARM-W-CO > 3 GO TO MPNOMODE-2-2.
1200*             IF COUNT-OUT > 80 GO TO MPNOMODE-2-2.
1201*             GO TO MPNOMODE-2-1.
1202*        MPNOMODE-2-2.
1203*             GO TO MPBMODE-1.
1204*        /
1205*        MPABMODE.
1206*        SPECIAL-1.
1207*             GO TO EXPANSION-DONE.
1208*        *    THESE ROUTINES HAVE NOT BEEN WRITTEN YET.
1209*        *    THEY DO NOT AFFECT THIS DEMONSTRATION.
1210*        /
1211*        FETCH-PARM-OUT.
1212*             MOVE INSPECTOR TO FETCH-1.
1213*             MOVE 0 TO FETCH-2.
1214*             ADD 1 TO FETCH-CO.
1215*             IF FETCH-CO > 9 MOVE 0 TO FETCH-CO.
1216*             ADD FETCH-CO TO FETCH-2.
1217*             SET PARM-CO TO FETCH.
1218*             MOVE PARM-CARD (PARM-CO) TO PARM-IN-TAB.
1219*             IF PARM-IN-TAB = "END       " MOVE BLANK10 TO PARM-IN-TAB.
1220*        FETCH-EXIT.
1221*             MOVE "Y" TO Y-SW.
1222*        FETCH-EXIT-1.
1223* 000480***    END OF PROGRAM    ***                                MPBPROG
```

What is claimed is:

1. A process for transformation of source code from an origin system of known characteristics for operation of a destination system of different known characteristics, with the aid of a digital computer, comprising the steps of:

(a) providing said computer with a source file containing said source code, comprising a plurality of sequential source code statements, some of which incorporate at least one macro name and parameter, and with an output file;

(b) providing said computer with a library file containing a plurality of sequential entries, each said entry comprising a macro name, a plurality of model statements, each said model statement comprising an expanded code field and a parametric triplet field, said expanded code field comprising expanded code which may incorporate parameters, and said triplet field comprising a number of triplets corresponding to the number of parameters in said expanded code field and each triplet identifying a parameter in said expanded code field and a condition of presence or absence of said parameter in said source code statements;

(c) sequentially fetching a source code statement from said source file, and initializing said library file;

(d) sequentially fetching an entry from said library file, and comparing said macro name of said entry with said source code statement;

(e) repetition of step (d) until said library file is exhausted and, if no macro name is found in said source code statement, passing said source code statement to said output file and reversion to step (c);

(f) sequentially fetching a model statement from said entry, if said macro name of said entry is found in said source code statement;

(g) sequentially fetching a triplet in said parametric triplet field of said model statement, and a parameter identified by said triplet in said expanded code field of said model statement;

(h) examining said source code statement for presence of said parameter;

(i) repetition of steps (g) and (h) until said triplets are exhausted and, if each said condition identified by each said triplet is not satisfied, then passing said expanded code field of said model statement to said output file;

(j) repetition of steps (f) through (i) until said model statements of said entry are exhausted; and (k) repetition of steps (c) through (j) until said source code statements are exhausted.

2. A process as claimed in claim 1 wherein each said sequential entry of said library file additionally comprises a function code provided in step (b), and further comprising the step after step (b) of providing said computer with a function code selection, and further comprising the step after step (d) of comparing each said function code of each said fetched entry with said function code selection and, if said function code of said entry is not equivalent to said function code selection, reversion to step (d).

3. A process as claimed in claim 1 including the step after step (b) of initializing and clearing a macro flag, the step after step (i) of setting said macro flag if said expanded code is passed to said output file, and the step after step (k) of passing said output file to said source file and repeating steps (a) through (k) if said macro flag is set.

4. A process of modification of source code developed for an origin system of known dialect, to produce source code for use in a destination system of differing from dialect, comprising the steps of:
   (a) providing a source file containing said source code, comprising a plurality of sequential source code statements incorporating parameters and macro names, each said macro name representing code to accomplish at least one basic function for data file manipulation including merge, update, extract, summarize and sort; and providing an empty output file;
   (b) providing said computer with a library file containing a plurality of sequential entries, each said entry comprising a macro name, one or more model statements, each said model statement comprising an expanded code statement which may incorporate one or more parameters, and a number of triplets each corresponding to one of the parameters in said expanded code statement, each said triplet specifying a condition of presence or absence of said corresponding parameter in a source code statement which inhibits passage of said expanded code to said output file;
   (c) sequentially fetching a source code statement from said source file, and initializing said library file;
   (d) sequentially fetching an entry from said library file, and comparing said macro name of said entry with said source code statement;
   (e) repetition of step (d) until said library file is exhausted and, if no macro name is found in said source code statement, passing said source code statement to said output file and reversion to step (c);
   (f) if said macro name of said entry is found in said source code statement, then sequentially fetching a model statement from said entry;
   (g) sequentially fetching a triplet in said model statement and a corresponding parameter in said expanded code statement of said model statement;
   (h) examining said source code statement for presence of said parameter;
   (i) repetition of steps (g) and (h) until said triplets of said model statement are exhausted and, if each said triplet does not inhibit passage of said expanded code statement to said output file, then passing said expanded code statement to said output file;
   (j) repetition of steps (f) through (i) until said model statements of said entry are exhausted; and
   (k) repetition of steps (c) through (j) until said source code statements are exhausted.

5. A process as claimed in claim 4 wherein said modes include a mode in which passage of said expanded code to said output file is inhibited by absence of said parameter in said source code statement.

6. A process as claimed in claim 4 wherein said modes include a mode in which passage of said expanded code to said output file is inhibited by presence of said parameter in said source code statement.

7. A process as claimed in claim 4 wherein said models include a mode in which passage of said expanded code statement to said output file is unconditionally conducted.

8. A method of transformation of source code, with the aid of a digital computer, comprising the steps of:
   (a) providing said computer with a source file containing said source code, comprising a plurality of sequential source code statements;
   (b) providing said computer with a library file comprising a plurality of sequential entries, each said entry comprising a macro name, a plurality of model statements, each said model statement comprising an expanded code field and a logical expression field, said expanded code field comprising expanded code which may incorporate a number of parameters, and said logical expression field comprising a number of logical expressions not greater than the number of parameters in said expanded code, each said logical expression indicating correspondence to one of said parameters in said expanded code statement and expressing a condition of appearance of said corresponding parameter in a source code statement also containing said macro name of said entry in which said logical expression is found, under which said expanded code replaces said source code statement;
   (c) examining each said source code statement for presence therein of any of said macro names;
   (d) if one said macro name is found in said source code statement, then examining each said model statement of said sequential entry of said library file containing said one macro name for presence of any said logical expressions and corresponding parameters, and examining said source code statement for presence of said corresponding parameters; and
   (e) if said source code statement fails to satisfy each said condition expressed by each said logical expression within one said model statement, then replacing said source code statement with said expanded code statement of said one said model statement.

* * * * *